(12) United States Patent
Yamamoto et al.

(10) Patent No.: US 11,037,598 B2
(45) Date of Patent: *Jun. 15, 2021

(54) DETECTING DAMAGED AREAS ON MAGNETIC TAPE BASED ON MEASURING A NUMBER OF SERVO ERRORS

(71) Applicant: International Business Machines Corporation, Armonk, NY (US)

(72) Inventors: Noriko Yamamoto, Tokyo (JP); Tsuyoshi Miyamura, Yokohama (JP); Hiroshi Itagaki, Yokohama (JP); Tohru Hasegawa, Tokyo (JP); Sosuke Matsui, Machida (JP); Shinsuke Mitsuma, Higashimurayama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,675

(22) Filed: Oct. 22, 2019

(65) Prior Publication Data

US 2020/0051592 A1 Feb. 13, 2020

Related U.S. Application Data

(63) Continuation of application No. 16/269,424, filed on Feb. 6, 2019, now Pat. No. 10,497,394, which is a
(Continued)

(51) Int. Cl.
*G11B 5/584* (2006.01)
*G11B 20/18* (2006.01)
(Continued)

(52) U.S. Cl.
CPC ........ *G11B 20/182* (2013.01); *G11B 20/1876* (2013.01); *G11B 20/1886* (2013.01);
(Continued)

(58) Field of Classification Search
None
See application file for complete search history.

(56) References Cited

U.S. PATENT DOCUMENTS 5,394,280 A 2/1995 Chliwnyj et al.
5,872,672 A * 2/1999 Chliwnyj ............. G11B 5/5508
360/53

(Continued)

FOREIGN PATENT DOCUMENTS

CN 1917072 A 2/2007
CN 102265346 A 11/2011
(Continued)

OTHER PUBLICATIONS

IBM, "Statistical Analysis and Reporting System (SARS)," IBM Knowledge Center, TS1140 Tape Drive (3592-E07), Aug. 2017, 1 page, retrieved from https://www.ibm.com/support/knowledgecenter/STPRH6/com.ibm.storage.drives.doc/sars.html.
(Continued)

*Primary Examiner* — Tan X Dinh
(74) *Attorney, Agent, or Firm* — Zilka-Kotab, P.C.

(57) ABSTRACT

A computer-implemented method, according to one embodiment, includes: receiving, from a tape drive, a first error location on a magnetic tape where a first error occurred, in addition to determining one or more areas on the magnetic tape to be examined based on the first error location. Independent of a read and/or write operation, the tape drive is instructed to induce relative motion between a tape head and the magnetic tape such that the tape head is positioned adjacent to each of the respective one or more areas in turn. Moreover, each of the one or more areas having a respective number of measured servo errors which exceeds a threshold value is identified as a damaged area of the magnetic tape.

20 Claims, 17 Drawing Sheets

Related U.S. Application Data continuation of application No. 15/849,187, filed on Dec. 20, 2017, now Pat. No. 10,242,709.

(51) Int. Cl.
    *G11B 27/36*     (2006.01)
    *G11B 5/55*     (2006.01)

(52) U.S. Cl.
    CPC .......... *G11B 5/5504* (2013.01); *G11B 5/5513* (2013.01); *G11B 5/584* (2013.01); *G11B 27/36* (2013.01); *G11B 2020/1823* (2013.01); *G11B 2020/1826* (2013.01)

(56) References Cited

U.S. PATENT DOCUMENTS

| | | | |
|---|---|---|---|
| 7,206,151 | B2 | 4/2007 | Kimura et al. |
| 7,277,246 | B2 | 10/2007 | Barbian et al. |
| 7,880,993 | B2 | 2/2011 | Masuda et al. |
| 9,653,114 | B1 | 5/2017 | Biskeborn et al. |
| 9,997,184 | B1* | 6/2018 | Bui ................ G11B 5/5926 |
| 10,109,313 | B1* | 10/2018 | Asmussen .......... G11B 20/1816 |
| 10,242,709 | B1 | 3/2019 | Yamamoto et al. |
| 10,497,394 | B2* | 12/2019 | Yamamoto ............. G11B 27/30 |
| 2002/0085304 | A1 | 7/2002 | Wang |
| 2003/0002214 | A1 | 1/2003 | Kitamura et al. |
| 2003/0107836 | A1 | 6/2003 | Zweighaft et al. |
| 2003/0206359 | A1 | 11/2003 | Hashimoto |
| 2005/0044451 | A1 | 2/2005 | Fry et al. |
| 2007/0041113 | A1* | 2/2007 | Mojica .................. G11B 27/36 360/31 |
| 2008/0266705 | A1* | 10/2008 | Saliba .................... G11B 5/584 360/31 |
| 2010/0202083 | A1 | 8/2010 | Bui et al. |
| 2011/0141602 | A1 | 6/2011 | Leopold, Jr. et al. |
| 2017/0032817 | A1* | 2/2017 | Bui ................... G11B 5/00826 |
| 2018/0102140 | A1 | 4/2018 | Biskeborn et al. |
| 2018/0102141 | A1 | 4/2018 | Biskeborn |
| 2018/0182420 | A1* | 6/2018 | Kaneko ................. G11B 5/78 |
| 2019/0080716 | A1* | 3/2019 | Asmussen .......... G11B 5/00821 |
| 2019/0189155 | A1 | 6/2019 | Yamamoto et al. |
| 2020/0051591 | A1 | 2/2020 | Yamamoto et al. |
| 2020/0051592 | A1* | 2/2020 | Yamamoto ......... G11B 20/1876 |
| 2020/0051593 | A1* | 2/2020 | Asmussen .......... G11B 5/00813 |

FOREIGN PATENT DOCUMENTS

| | | |
|---|---|---|
| CN | 103582914 A | 2/2014 |
| JP | 2004355748 A | 12/2004 |
| JP | 2013030257 A | 2/2013 |
| JP | 2016099728 A | 5/2016 |
| WO | 2019123076 A1 | 6/2019 |
| WO | WO-2019123076 A1 * | 6/2019 ............ G11B 27/30 |

OTHER PUBLICATIONS

IBM, "IBM Tape Library Guide for Open Systems," Redbooks, Aug. 2016, pp. 1-478.
IBM, "IBM TotalStorage LTO Ultrium Tape Drive," SCSI Reference, Sep. 28, 2015, pp. 1-525.
IBM, "IBM TS2270 Setup, Operator, and Service Guide Machine Type 3580 Model H7S", Oct. 2015, pp. 1-154.
SNIA, "Linear Tape File System (LTFS) Format Specification," SNIA Technical Position, Version 2.2.0, Dec. 21, 2013, pp. 1-69.
JEITA, "Tape system Technical Material, Chapter 6, Servo Technologies Supporting High Recording Density," JEITA Tape Storage Technical Committee, 2017, 9 pages, retrieved from http://home.jeita.or.jp/is/committee/tech-std/std/201104/tape_system_06.pdf Original Japanese Translation Included.
IBM, "Introduction to IBM Spectrum Archive Enterprise Edition," IBM Knowledge Center, Aug. 2017, pp. 1-3, retrieved from http://www.ibm.com/support/knowledgecenter/ST9MBR_1.2.1/ltfs_ee_intro.html.
Yamamoto et al., U.S. Appl. No. 15/849,187, filed Dec. 20, 2017.
Non-Final Office Action from U.S. Appl. No. 15/849,187, dated May 17, 2018.
Notice of Allowance from U.S. Appl. No. 15/849,187, dated Nov. 13, 2018.
Supplemental Notice of Allowance from U.S. Appl. No. 15/849,187, dated Dec. 12, 2018.
International Search Report and Written Opinion from PCT Application No. PCT/IB2018/059695, dated Feb. 27, 2019.
Yamamoto et al., U.S. Appl. No. 16/269,424, filed Feb. 6, 2019.
Non-Final Office Action from U.S. Appl. No. 16/269,424, dated Mar. 21, 2019.
Final Office Action from U.S. Appl. No. 16/269,424, dated Jun. 12, 2019.
Notice of Allowance from U.S. Appl. No. 16/269,424, dated Jul. 31, 2019.
List of IBM Patents or Patent Applications Treated as Related, Nov. 12, 2019.
Yamamoto et al., U.S. Appl. No. 16/660,659, filed Oct. 22, 2019.
Non-Final Office Action from U.S. Appl. No. 16/660,659, dated Apr. 13, 2020.
Final Office Action from U.S. Appl. No. 16/660,659, dated Aug. 10, 2020.
Final Office Action from U.S. Appl. No. 16/660,659, dated Aug. 4, 2020.
Examination Report from European Application No. GB2010001.2, dated Aug. 25, 2020.
Advisory Action from U.S. Appl. No. 16/660,659, dated Jan. 8, 2021.
Final Office Action from U.S. Appl. No. 16/660,659, dated Oct. 20, 2020.
Notice of Allowance from U.S. Appl. No. 16/660,659, dated Feb. 3, 2021.
Corrected Notice of Allowance from U.S. Appl. No. 16/660,659, dated Mar. 8, 2021.
Corrected Notice of Allowance from U.S. Appl. No. 16/660,659, dated Mar. 18, 2021.
Corrected Notice of Allowance from U.S. Appl. No. 16/660,659, dated Apr. 1, 2021.

* cited by examiner

DETECTING DAMAGED AREAS ON MAGNETIC TAPE BASED ON MEASURING A NUMBER OF SERVO ERRORS

BACKGROUND

The present invention relates to tape storage systems, and more specifically, to detecting damaged areas on magnetic tape.

Timing-based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader. Moreover, a longitudinal position estimate of a magnetic head relative to a tape may be determined from the signal generated by a servo reader.

In a TBS format, the servo pattern is prerecorded in several bands distributed across the tape. Typically, five or nine servo pattern bands are included on a given tape which runs about parallel to a longitudinal axis of the tape. Data is recorded in the regions of tape located between pairs of the servo bands. In read/write heads of IBM linear tape-open (LTO) and Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

Estimates of the head lateral and/or longitudinal position with respect to a magnetic tape derived from the servo patterns may be used to determine the location of damaged regions on the magnetic tape. For instance, when a read and/or write error occurs while accessing a magnetic tape media that has been damaged for some reason, analysis can be conducted to locate the area where the tape is damaged on the basis of history information that has been saved on the tape media or a tape drive. However, when the history information is limited or when limited read and/or write operations have been performed on the damaged tape around the area where the error has occurred, conventional products are simply unable to identify the area in which the tape is damaged.

There are cases in which an unpredictable problem caused by the damaged region of the tape is detected after a period of time has elapsed. These unpredictable problems may appear as a write error, a decrease in the amount of writable capacity, a read error occurring while reading written data, or increased latency while reading data. However, by the time these unpredicted problems appear in some cases, the tape is already unloaded from the tape drive and the error information relevant to the tape is lost. In other cases the damaged tape is loaded into another tape drive, whereby the history information relevant to the tape is overwritten and lost. Accordingly, the information is unobtainable in such situations, and conventional products are again simply unable to identify areas in which the tape is damaged.

In an attempt to overcome this inability to identify damaged area(s) on the magnetic tape in such situations, some conventional products conduct diagnostic tests. These diagnostic tests are performed by a tape drive and include actually writing data on the tape in an attempt to locate the damaged area(s) by noting where subsequent errors occur while writing the data. However, data that is already stored on the tape must be read and transitioned to another tape before performing the diagnostic testing may be conducted in order to avoid losing the data altogether. Accordingly, diagnostic testing undesirably increases latency while also consuming additional storage capacity.

It follows that conventional products have been unable to efficiently and accurately locate damaged areas on magnetic tape. A solution to this standing issue is desirable in order to improve data retention as well as management of data storage media.

SUMMARY

A computer-implemented method, according to one embodiment, includes: receiving, from a tape drive, a first error location on a magnetic tape where a first error occurred, in addition to determining one or more areas on the magnetic tape to be examined based on the first error location. Independent of a read and/or write operation, the tape drive is instructed to induce relative motion between a tape head and the magnetic tape such that the tape head is positioned adjacent to each of the respective one or more areas in turn. Moreover, each of the one or more areas having a respective number of measured servo errors which exceeds a threshold value is identified as a damaged area of the magnetic tape.

A computer program product, according to another embodiment, includes a computer readable storage medium having program instructions embodied therewith. Moreover, the program instructions are readable and/or executable by a processor to cause the processor to: perform the foregoing method.

A tape drive, according to yet another embodiment, includes: a controller, and logic integrated with and/or executable by the controller. The logic is configured to cause the controller to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
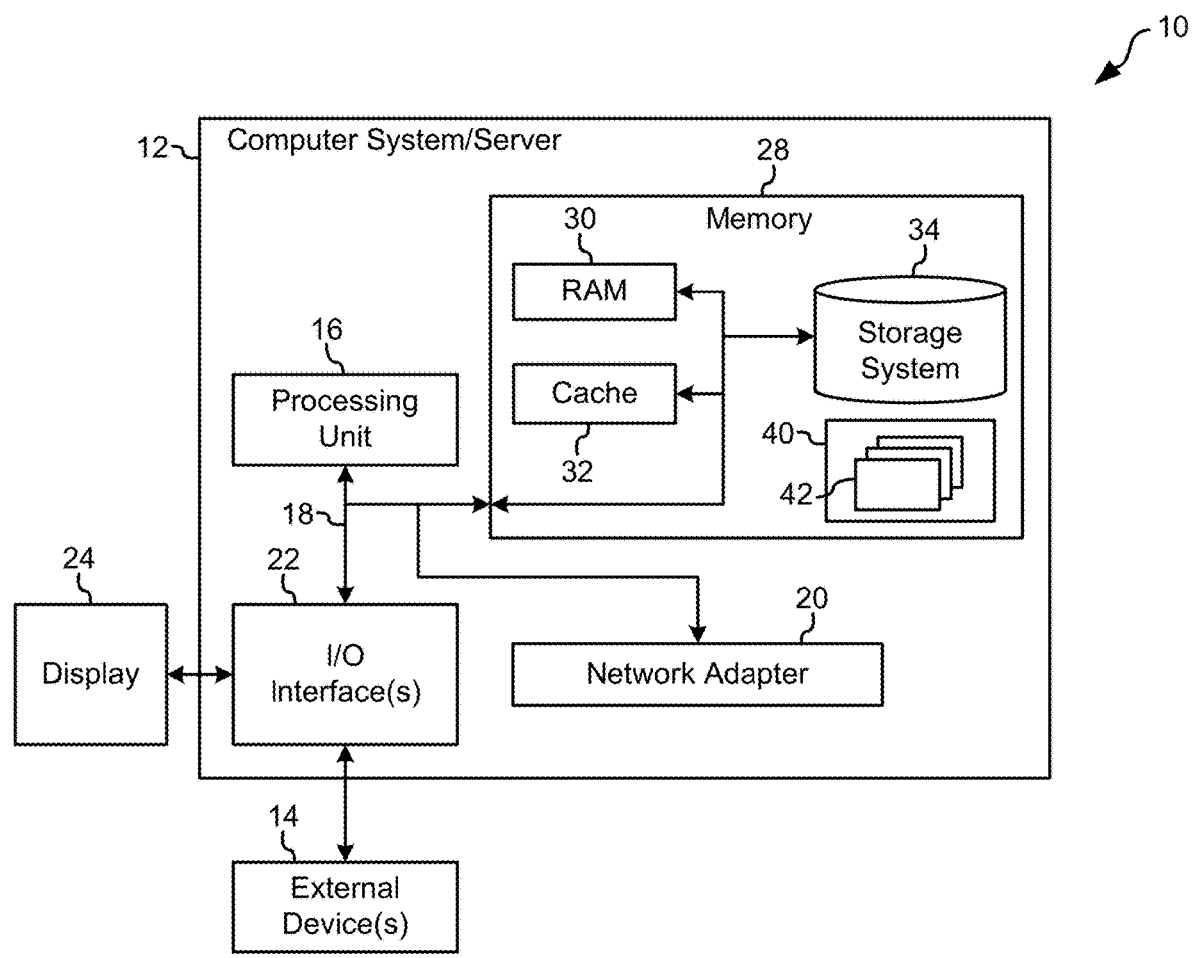
FIG. 1 is a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for achieving an efficient processes for detecting, anticipating, remedying, etc. damaged areas on magnetic tape media, e.g., as will be described in further detail below.

One general embodiment includes a computer-implemented method for determining a damaged area of a magnetic tape loaded in a tape drive. The method includes: detecting a first error while accessing a magnetic tape, determining a first error location on the magnetic tape where the first error occurred, determining one or more areas on the magnetic tape to be examined, independent of a read and/or write operation, inducing relative motion between a tape head and the magnetic tape such that the tape head is positioned adjacent to each of the respective one or more areas in turn, using the tape head to measure a number of servo errors that occur in each of the respective one or more areas, and identifying each of the one or more areas having a respective number of measured servo errors which exceeds a threshold value as a damaged area of the magnetic tape. The one or more areas are determined using a predetermined algorithm which incorporates the first error location.

Another general embodiment includes a computer program product for determining a damaged area of a magnetic tape loaded in a tape drive. The computer program product includes a computer readable storage medium having program instructions embodied therewith. The computer readable storage medium is not a transitory signal per se. Moreover, the program instructions are readable and/or executable by a processor to cause the processor to perform the foregoing method.

Another general embodiment includes a computer-implemented method for determining a damaged area of a magnetic tape loaded in a tape drive. The method includes: receiving, from the tape drive, a first error location on the magnetic tape where a first error occurred in response to the tape drive experiencing the first error; determining one or more areas on the magnetic tape to be examined; independent of a read and/or write operation, instructing the tape drive to induce relative motion between a tape head and the magnetic tape such that the tape head is positioned adjacent to each of the respective one or more areas in turn; instructing the tape drive to measure a number of servo errors that occur in each of the respective one or more areas; and identifying each of the one or more areas having a respective number of measured servo errors which exceeds a threshold value as a damaged area of the magnetic tape. The one or more areas are determined using a predetermined algorithm which incorporates the first error location.

Another general embodiment includes a computer program product for determining a damaged area of a magnetic tape loaded in a tape drive. The computer program product includes a computer readable storage medium having program instructions embodied therewith. The computer readable storage medium is not a transitory signal per se. Moreover, the program instructions are readable and/or executable by a processor to cause the processor to perform the foregoing method.

In still another general embodiment, a tape drive includes: a controller; and logic integrated with and/or executable by the controller for determining a damaged area of a magnetic tape loaded in a tape drive, the logic being configured to cause the controller to: determine, by the controller, a first error location on the magnetic tape where a first error occurred in response to the tape drive experiencing the first error; determine, by the controller, one or more areas on the magnetic tape to be examined; independent of a read and/or write operation, induce relative motion between a tape head and the magnetic tape such that the tape head is positioned adjacent to each of the respective one or more areas in turn; measure a number of servo errors that occur in each of the respective one or more areas; and identify each of the one or more areas having a respective number of measured servo errors which exceeds a threshold value as a damaged area of the magnetic tape. The one or more areas are determined using a predetermined algorithm which incorporates the first error location.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disc drive for reading from or writing to a removable, non-volatile optical disc such as a compact disc read-only memory (CD-ROM), digital versatile disc-read only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
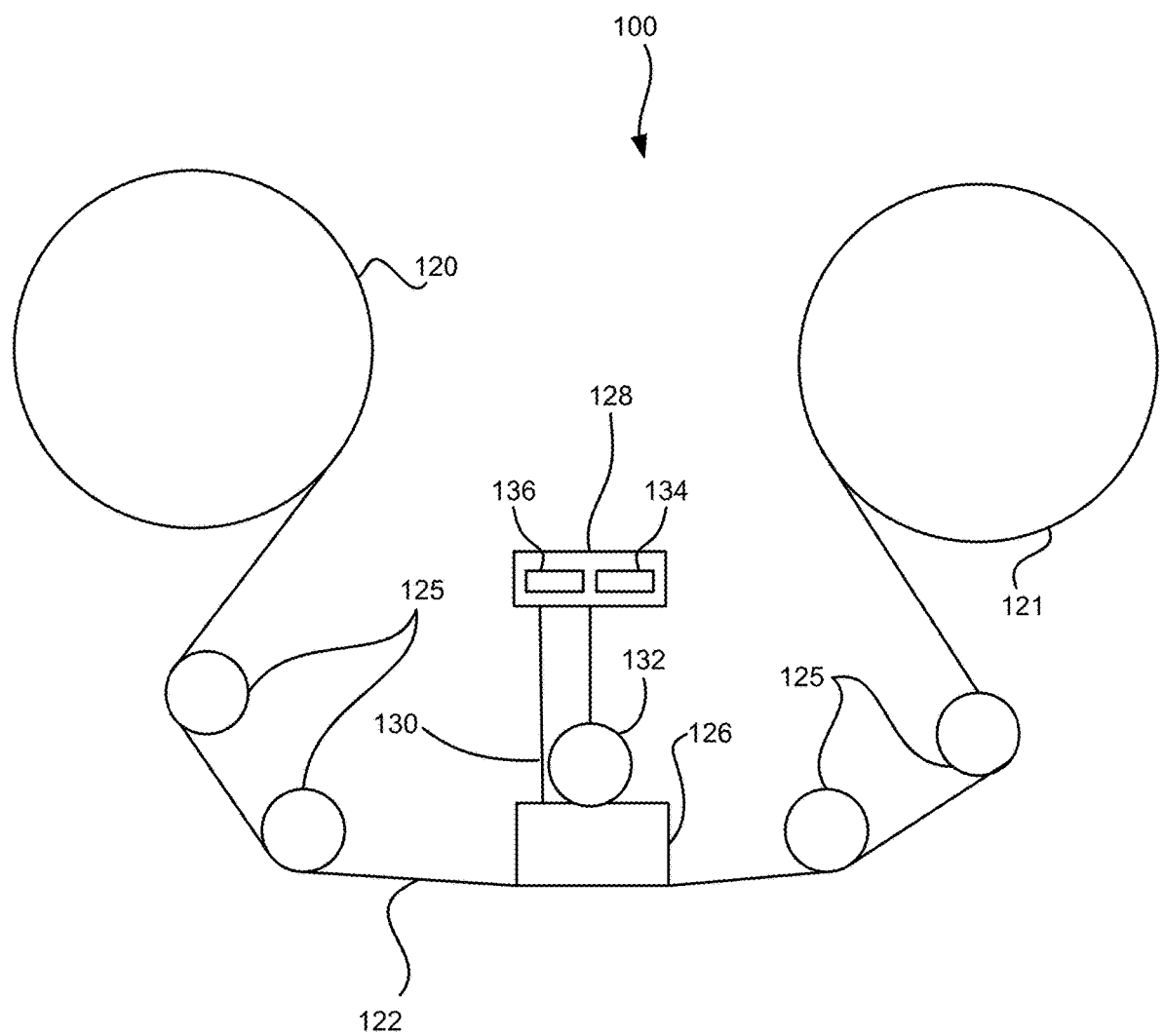
FIG. 2 is a simplified tape drive of a tape-based data storage system, according to one embodiment.

Looking to FIG. 2, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
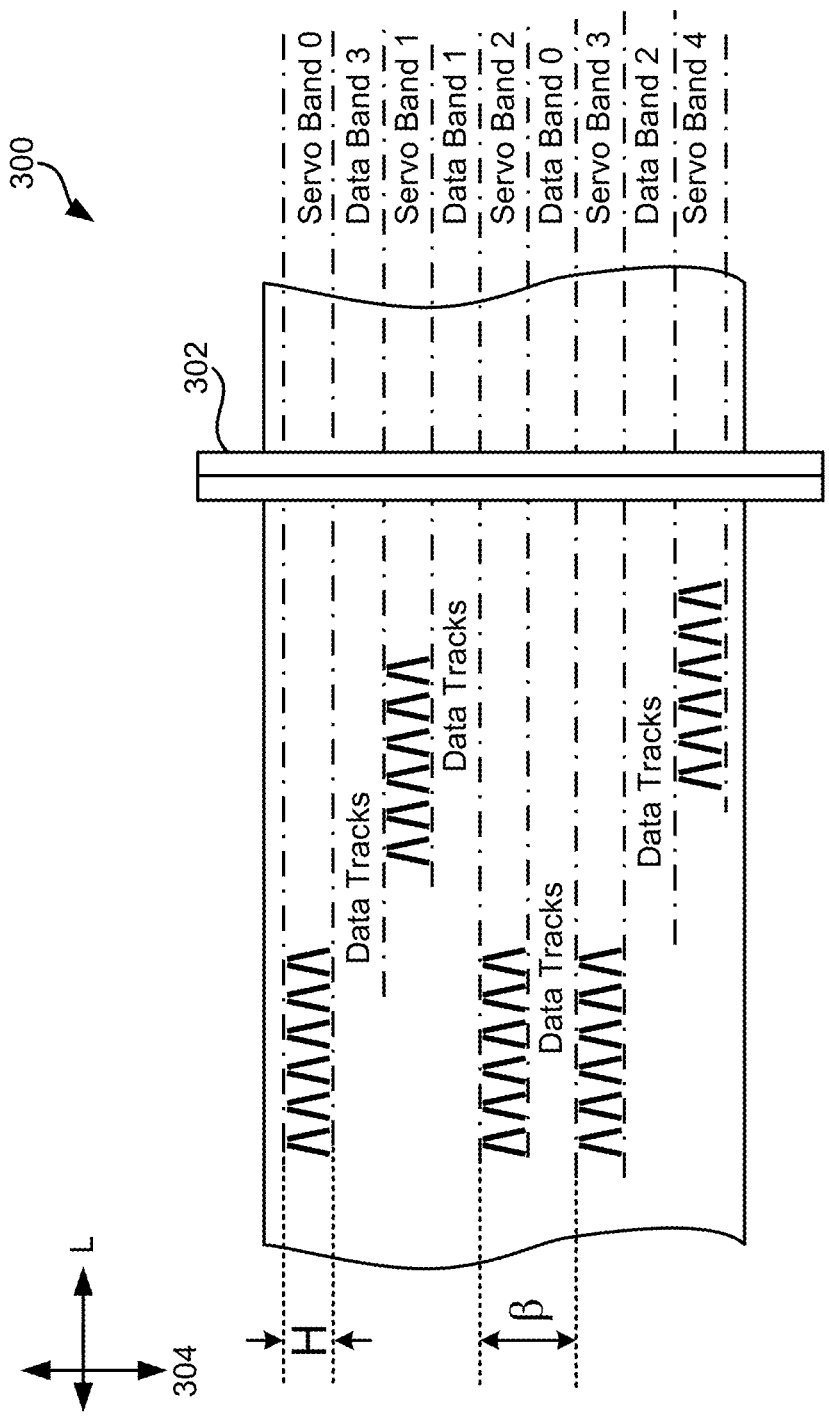
FIG. 3 is a tape layout, according to one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the LTO format and IBM Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch β between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the PES, thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

In still further embodiments, a standard TBS servo pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

Figure 4A:
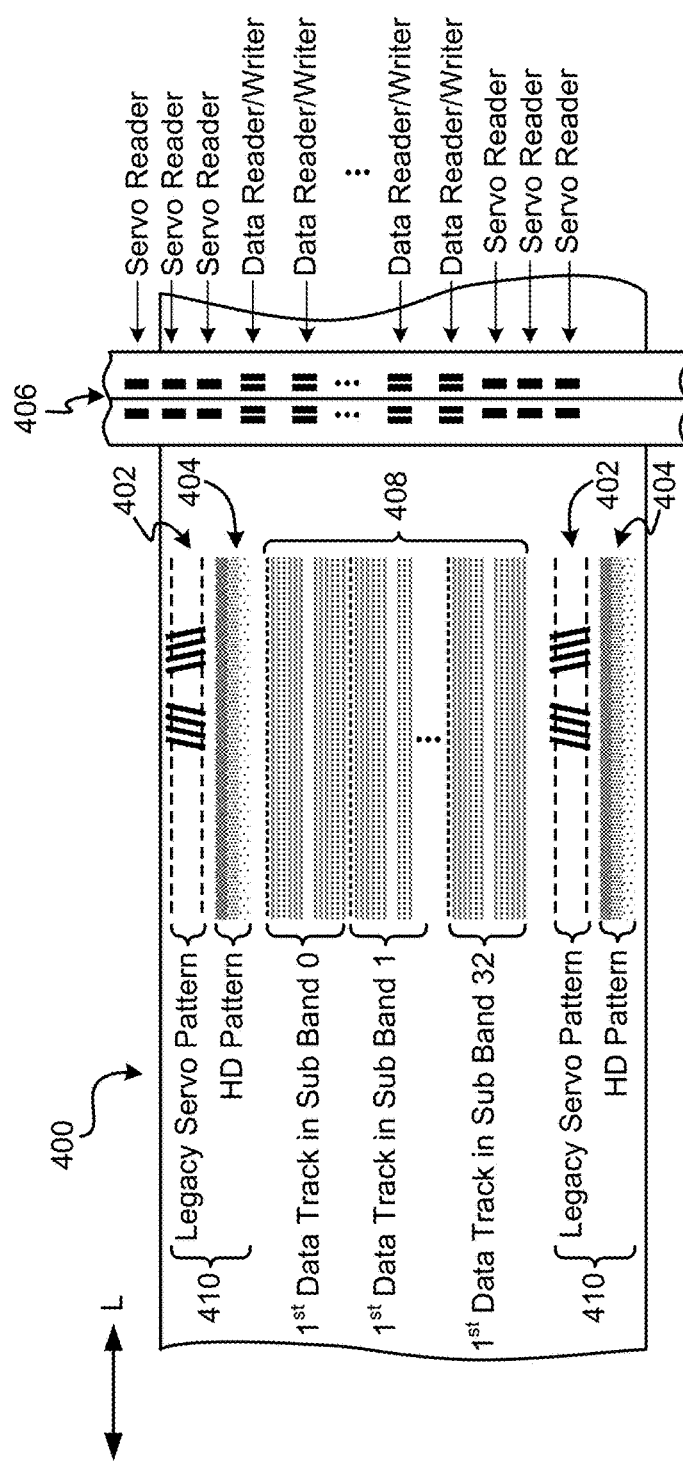
FIG. 4A is a hybrid servo pattern written in a dedicated area of a tape medium, according to one embodiment.
Figure 5C:
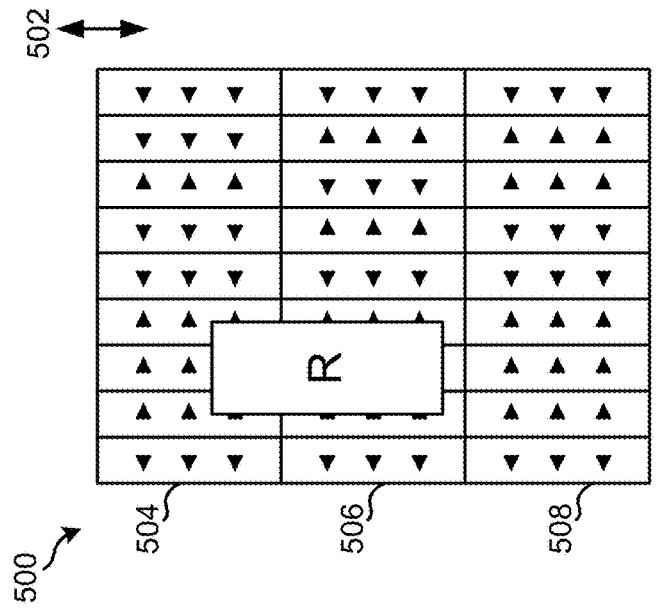
FIG. 5C is a HD pattern, according to one embodiment.
Figure 11A:
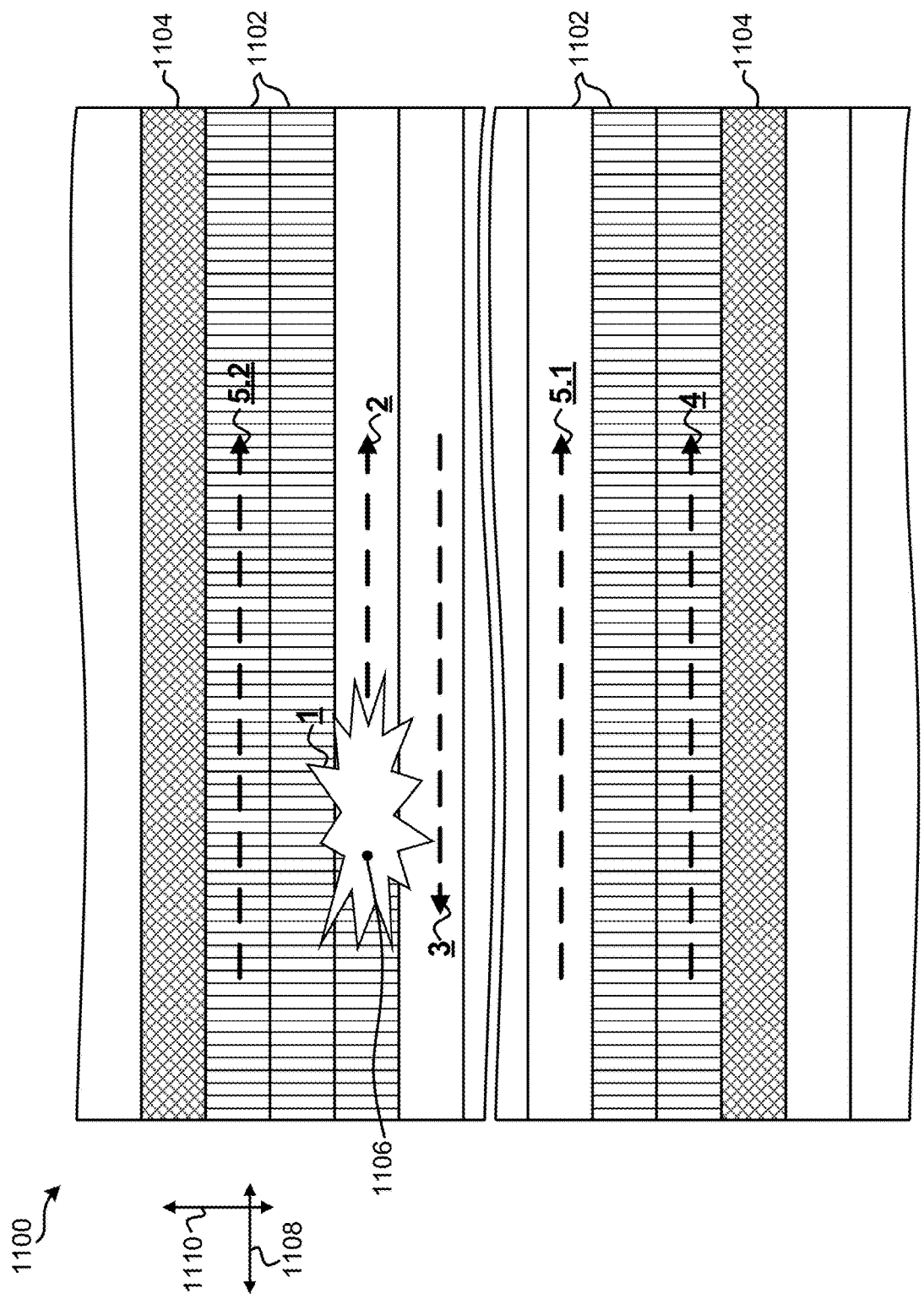
FIG. 11A is a representational view of a predetermined algorithm, according to one embodiment.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform, e.g., as seen in FIGS. 5A, 5C and 11A below. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, LPOS, etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution involves the integration interval being multiples of the DFT/FFT size.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

Referring again to FIG. 4A, which shows a tape layout 400 with a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Figure 4B:
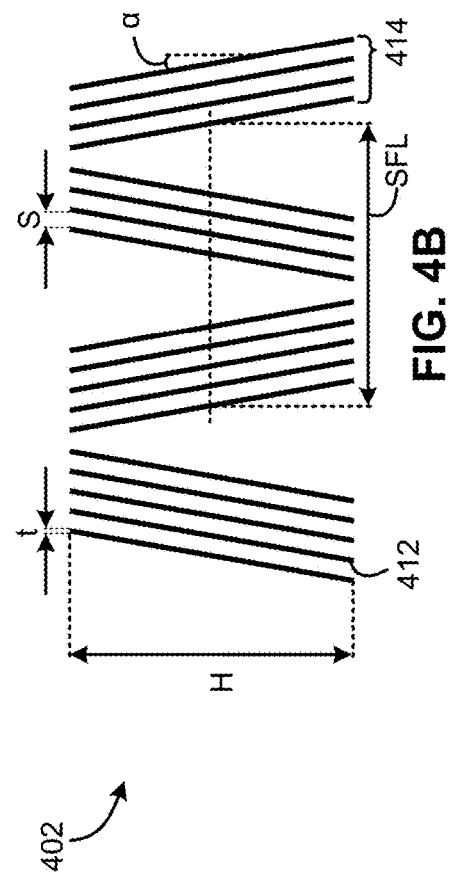
FIG. 4B is a partial detailed view of a TBS pattern, according to one embodiment.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle α. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 μm, and the angle α may be about 6°, while the thickness t is about 2.1 μm. Moreover, the spacing S between each of the servo stripes 412 and/or the sub-frame length SFL between servo bursts 414 having the same azimuthal slope may vary depending on the desired embodiment. According to an exemplary approach, which is in no way intended to limit the invention, the spacing S may be about 5 μm, while the sub-frame length SFL is about 100 μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

An HD servo pattern preferably includes periodic waveforms of differing frequencies alternately written in the lateral (cross-track) direction. Accordingly, HD servo patterns may be able to desirably provide more accurate and/or more frequent estimates of servo channel parameters according to various embodiments described herein. Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically across the band where the HD pattern is written. In the embodiment of FIGS. 5A and 5C, the servo reader (denoted by the block labelled 'R') spans wider in the cross-track direction 502 than a single track, such that at least two tones are detected under any reading conditions at a given time when the servo reader R is overlapped with the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 μm to about 150 μm, such as about 60 μm, about 75 μm, about 100 μm, etc., depending on the approach. Moreover, the symbol length may be in a range from about 0.5 μm to about 3.0 μm, e.g., such as about 1.0 μm, about 1.5 μm, about 2.0 μm, etc.

Hence, with continued reference to FIGS. 5A-5D, an edge of one of the portions of the HD pattern 500 may be distinguished from the edge of another of the portions. Looking specifically to FIG. 5A, an edge of the middle portion 506 may be distinguished from an edge of the bottom portion 508 by evaluating the signals read by the servo reader R, which overlaps both portions 506, 508. The graph 510 in FIG. 5B identifies the various frequencies in the readback signal from servo reader R and the energy level corresponding to each of the respective frequencies for the position of the servo reader R shown in FIG. 5A. Energy values may be determined in some approaches by integrating over a given amount of time (or distance along the tape). As shown in graph 510, in addition to the middle frequency $f_2$, the bottom frequency $f_1$ is present in the readback signal of the servo reader R and may thereby be detected by a spectral analysis. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R can be determined to be overlapped with the middle portion 506 more than it is overlapped with the bottom portion 508. Moreover, a comparison of the corresponding energies may be used to determine a fine position of the servo reader R with respect to a magnetic tape.

Figure 5D:
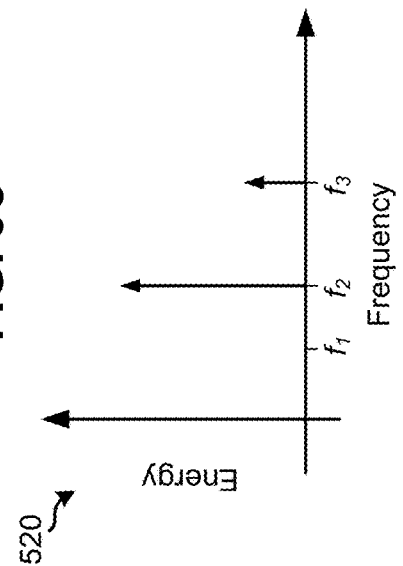
FIG. 5D is a graph plotting readback energy vs. frequency for the reader in FIG. 5C.
Figure 5A:
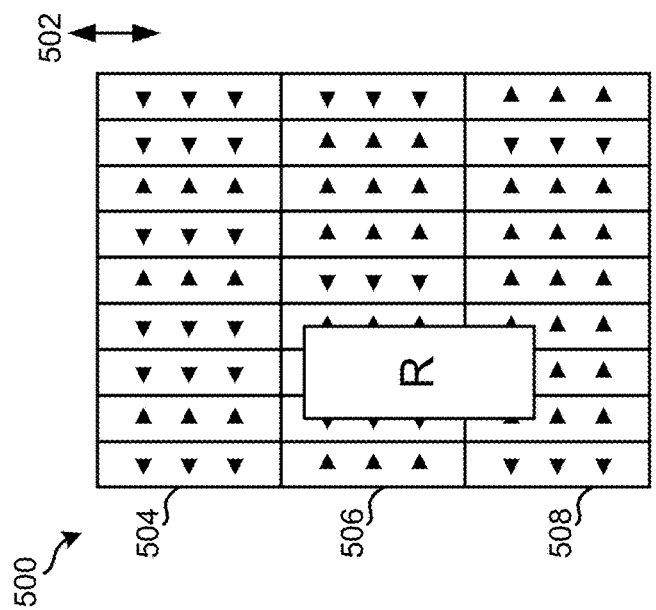
FIG. 5A is a HD pattern, according to one embodiment.
Figure 5B:
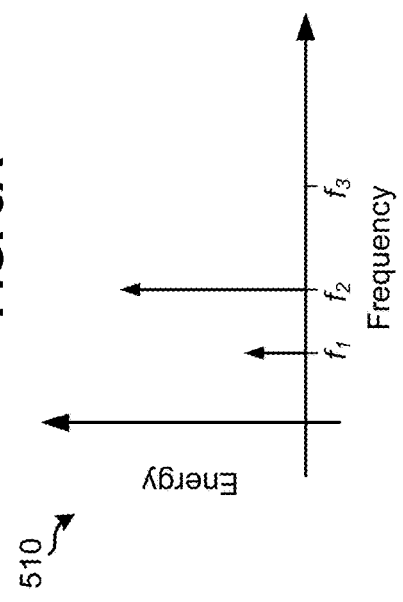
FIG. 5B is a graph plotting readback energy vs. frequency for the reader in FIG. 5A.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ indicate that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, a comparison of the corresponding energy values may be used to determine a fine position of the servo reader R with respect to a magnetic tape.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

Figure 6:
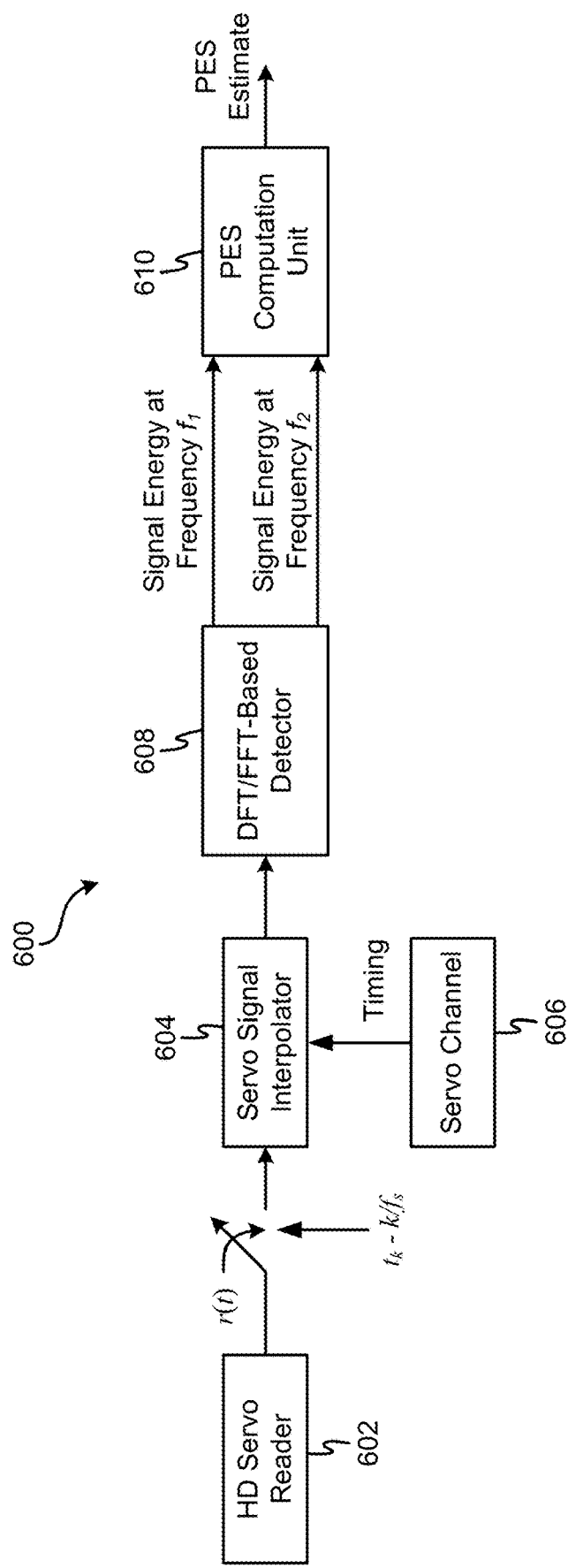
FIG. 6 is a block diagram of a detector for HD patterns, according to the prior art.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
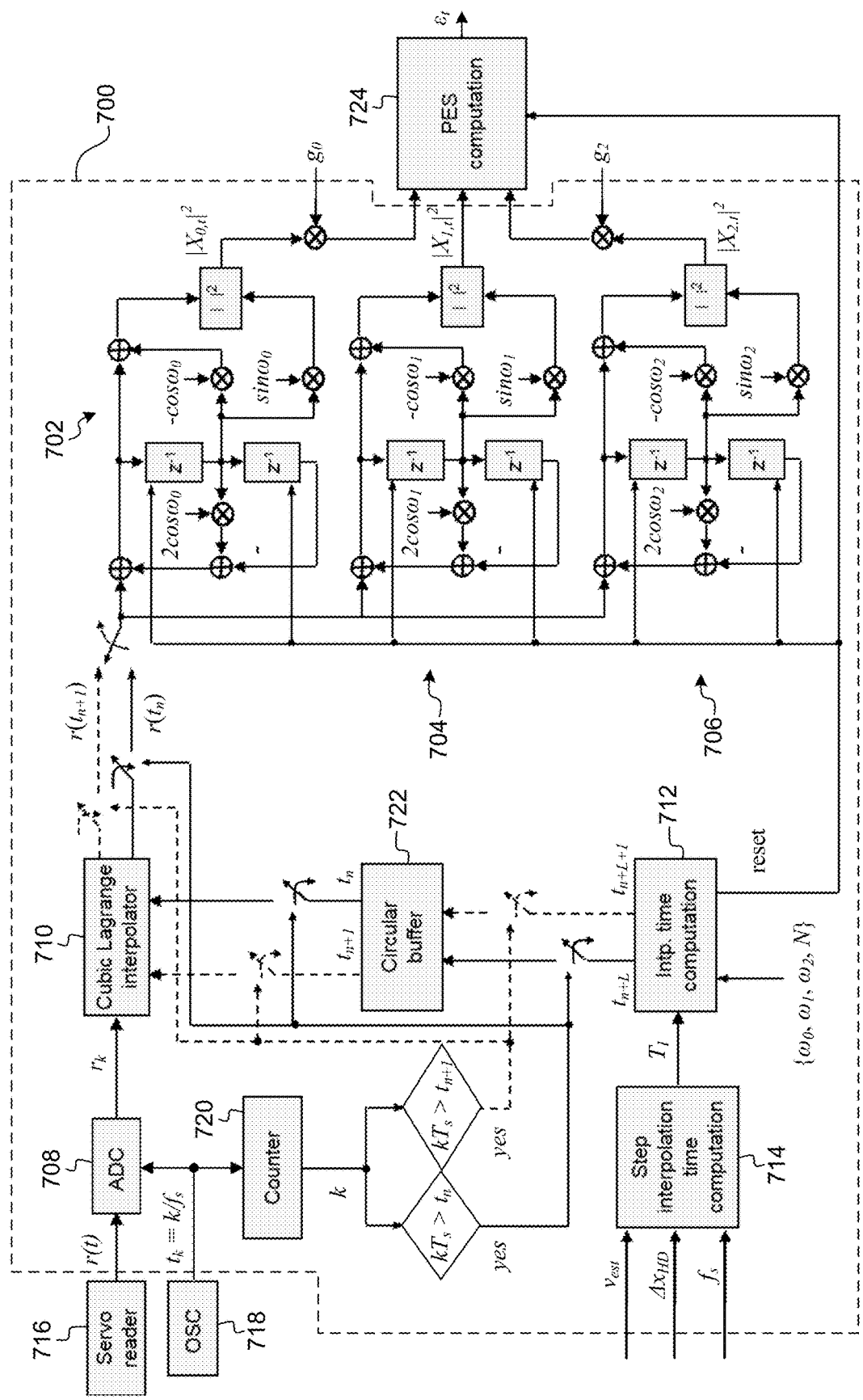
FIG. 7 is a block diagram of a detector for HD patterns, according to one embodiment.

Now referring to FIG. 7, a detector 700 for HD patterns is shown according to one embodiment. The detector 700 is configured to operate with periodic waveforms, which correspond to the components of the readback signal of an HD pattern, that are characterized by three frequencies at any time, as illustrated for example in FIGS. 5A-5B according to one embodiment. With continued reference to FIG. 7, the detector 700 includes three digital filters 702, 704, 706 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 702, 704, 706, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 702, 704, 706, and more preferably a difference of less than about 0.1%. This may be achieved by resampling the output sequence of the analog-to-digital converter (ADC) 708 at appropriate time instants, which may be provided by an interpolator 710, with a time base obtained from the tape velocity and a given interpolation distance $\Delta x_{HD}$, as shown in FIG. 7. The frequency $f_s$ of the clock 718, is used as an input to the ADC 708, the counter 720, and the digital circuitry of the detector 700. Moreover the frequency $f_s$ of the clock 718 may be either a fixed frequency or a variable frequency.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the tape that are separated by a step interpolation distance equal to $\Delta x_{HD}$, independently of the tape velocity. $\Delta x_{HD}$ is preferably selected such that the condition $T/\Delta x_{HD}=K$ is satisfied independently of the tape velocity, where K is a positive integer number. The time base for the generation of the interpolator output samples may be provided by an interpolation time computation unit 712, which yields the sequence of time instants $\{t_n\}$, at which the resampling of the ADC output sequence takes place. Time instants $\{t_n\}$ may furthermore be provided to circular buffer 722.

The detector 700 illustrated in FIG. 7 may be configured such that a given number of samples is computed by the interpolator 710 within a clock interval $T_s=1/f_s$. However, doing so may set a limit on the maximum tape velocity at which the detector 700 may operate, the maximum tape velocity represented by $2\Delta x_{HD}/T_s$. The maximum tape velocity supported by the detector 700 may be increased by allowing a larger number of samples to be computed by the interpolator 710 within a single clock interval, but doing so also increases computational complexity.

For a fixed tape velocity, the time instants $\{t_n\}$ may be uniformly spaced by $T_I$ seconds, where $T_I$ denotes the time interval that it takes for the tape to travel over a distance equal to the step interpolation distance $\Delta x_{HD}$. The estimation of the time interval $T_I$ is performed by a step interpolation time computation unit 714, which computes $T_I=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_s/T_s$, where $T_s=1/f_s$ denotes the clock interval. The ADC clock frequency, $f_s$, may be a fixed frequency in one approach, or a variable frequency in another approach.

In one embodiment, the HD detector 700 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

In another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i = 2\pi f_i$ from which the coefficients of the digital filters 702, 704, 706 are obtained. These frequencies may be obtained from the knowledge of the servo reader lateral position provided by the TBS channel in one embodiment, as described above. Assuming the number "Q" represents the number of samples over which the estimates of the energies of the periodic waveforms are computed, Q may determine the length of the integration interval, and therefore may also determine the spatial frequency resolution. Assuming the value of Q is even, Q/2 represents the number of frequencies for which energy estimates would be provided by a DFT/FFT-based HD detector that operates over Q samples. Q may be obtained from the tape drive memory in one embodiment. Moreover, Q is typically about 100 or larger.

Multiplication of the three energy estimates by gain factors $g_i$, for i=0, 1, 2, is provided to compensate for the different attenuations that the readback HD servo signal may experience at different frequencies, where the normalization $g_1=1$ may be assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,t}|^2$ from the three digital filters 702, 704, 706 are provided to a PES computation unit 724, which provides a position error estimate ($\varepsilon_t$) at given time t.

Other components of the HD detector 700 may operate as would be known to one of skill in the art, and are omitted here for the sake of clarity of the described embodiments.

As previously mentioned, estimates of a magnetic head lateral and/or longitudinal position with respect to a magnetic tape derived from the servo patterns may be used to determine the location of damaged regions on the magnetic tape. For instance, when a read and/or write error occurs while accessing a magnetic tape media that has been damaged for some reason, analysis can be conducted to locate the area where the tape is damaged on the basis of history information that has been saved on the tape media or a tape drive. For instance, analysis may be conducted in order to locate the area where a magnetic tape has been damaged (e.g., such as a bend or wear), on the basis of error history and/or statistical information, e.g., such as mount history, or statistical analysis and reporting system (SARS) which are stored in cartridge memory, in a tape region outside the user data region of the tape, or in memory of the tape drive. In other situations, error information per tape area stored in memory of the tape drive when reading from and/or writing to a tape may be used in an attempt to located damaged areas.

However, when the history information is limited or when limited read and/or write operations have been performed on the damaged tape around the area where the error has occurred, conventional products are simply unable to identify the area in which the tape is damaged. Accordingly, conventional products which rely on history and/or statistical information to determine damaged areas on a magnetic tape are undesirable in view of the numerous situations where the information is unobtainable.

Moreover, there are cases in which an unpredictable problem caused by the damaged region of the tape is detected after a period of time has elapsed. These unpredictable problems may appear as a write error, a decrease in the amount of writable capacity, a read error occurring while reading written data, or increased latency while reading data. However, by the time these unpredicted problems appear in some cases, the tape is already unloaded from the tape drive and the error information relevant to the tape is lost. In other cases, the damaged tape is loaded into another tape drive, whereby the history information relevant to the tape is overwritten and lost. Accordingly, the information is unobtainable in such situations, and conventional products are again simply unable to identify areas in which the tape is damaged.

In an attempt to overcome this inability to identify damaged area(s) on the magnetic tape in such situations, some conventional products conduct diagnostic tests. These diagnostic tests are performed by a tape drive and include actually writing data on the tape in an attempt to locate the damaged area(s) by noting where subsequent errors occur while writing the data. However, data that is already stored on the tape must be read and transitioned to another tape before performing the diagnostic testing may be conducted in order to avoid losing the data altogether. Accordingly, diagnostic testing as implemented in conventional products undesirably increases latency while also consuming additional storage capacity.

It follows that conventional products have been unable to efficiently and accurately locate damaged areas on magnetic tape. A solution to this standing issue is desirable in order to improve data retention as well as management of data storage media.

In sharp contrast to the above-mentioned shortcomings experienced by conventional products, various embodiments described and/or suggested herein introduce efficient processes for detecting damaged areas on magnetic tape media, e.g., as will soon become apparent.

Figure 8:
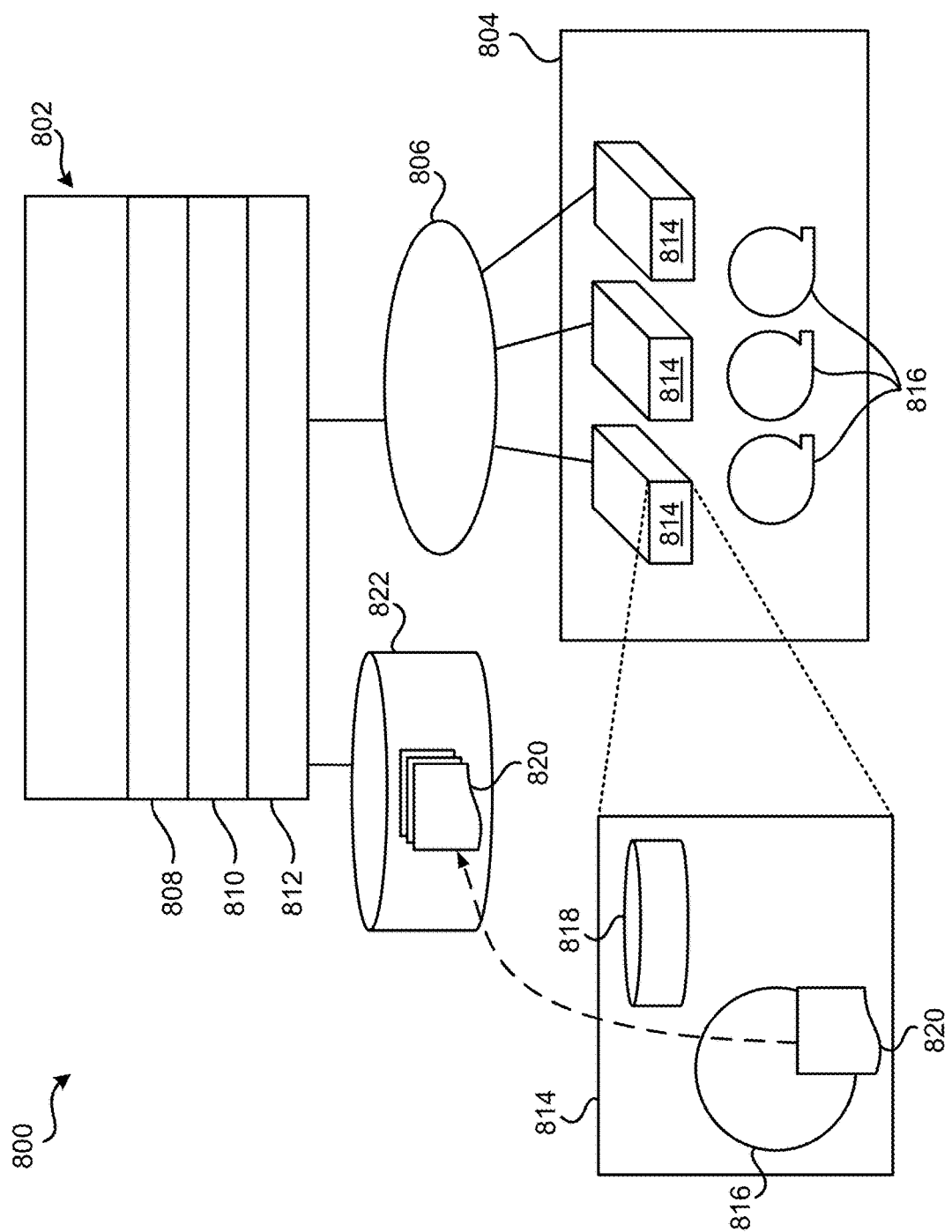
FIG. 8 is a partial representational view of a system, according to one embodiment.

Looking to FIG. 8, a high level view of a system 800 is illustrated in accordance with one embodiment. As an option, the present system 800 may be implemented in conjunction with features from any other embodiment listed herein, such as those described with reference to the other FIGS. However, such system 800 and others presented herein may be used in various applications and/or in permutations which may or may not be specifically described in the illustrative embodiments listed herein. Further, the system 800 presented herein may be used in any desired environment. Thus FIG. 8 (and the other FIGS.) may be deemed to include any possible permutation.

As shown, system 800 includes a server 802 which is electrically coupled to a magnetic tape library 804 by a switch 806. According to the present embodiment, the server 802 includes an application 808, a linear tape file system (LTFS) 810 and a controller 812. The controller 812 may be a SCSI command controller which sends commands to a tape drive of the magnetic tape library 804, e.g., as will be described in further detail below. Moreover, the commands sent by the controller 812 may correspond to the application 808 and/or LTFS 810 included on the server 802.

The switch 806 may be used to direct commands to the appropriate (e.g., intended) tape drive 814. The switch 806 may be connected to the server 802 and/or the tape library 804 by a physical connection, e.g., such as a wire, a cable, a fibre optic connection, etc.; or a wireless connection, e.g., such as a Wi-Fi connection, a Bluetooth connection, a wide area network (WAN), etc. According to an example, which is in no way intended to limit the invention, the switch 806 may be connected to the server 802 and the tape library 804 by a fibre channel and/or a serial-attached SCSI (SAS) which extends therebetween. In an illustrative approach, the switch 806 may be directly coupled to one or more tape drives 814 in the tape library 804. Accordingly, instructions may be sent from the server 802 directly to one or more of the tape drives 814, and responses may be returned from one or more of the tape drives 814 to the server 802, e.g., as will be described in further detail below.

As previously mentioned, the one or more tape drives 814 are included in the tape library 804. According to some approaches, each of the tape drives 814 may also have their own memory and a tape map stored therein. For example, looking to the exploded view of the leftmost tape drive 814 in the tape library 804, a memory 818 and tape are included therein. Moreover, the tape is shown as including an LTFS Index, e.g., as will be described in further detail below. The tape map in memory 818 may include servo errors which are recorded on a tape-area basis. Specifically, tape map may divide each wrap of the magnetic tape into 112 regions, while storing consolidated error information for each of the regions. Depending on the approach, servo errors may include a PES generated during a tape read and/or write operation, read and/or write errors which are "temporary", etc.

The tape library 804 also includes a plurality of magnetic tapes 816 which may be loaded in the tape drives 814 in order to read data from and/or write data to the magnetic tapes 816. According to some approaches, each of the magnetic tapes 816 may be stored in a tape cartridge (not shown), and the tape cartridges may in turn be stored in storage slots of the tape library 804. A robotic accessor may further be included in the tape library 804 and may be used to transport tape cartridges between their respective storage slots and the tape drives 814, e.g., depending on requests received from the server 802.

In some embodiments, an IBM Spectrum Archive Library Edition and/or Enterprise Edition may be installed in the server 802. Moreover, the server may access file data on tape using the LTFS 810. According to an exemplary approach, which is in no way intended to limit the invention, looking to the magnetic tape 816 loaded into the leftmost tape drive 814, an LTFS Index 820 may be read from the magnetic tape 816 into a storage device 822 (e.g., such as memory or a disk) which is coupled to the server 802. The information stored in the LTFS Index may correspond to files on the magnetic tape, and may include the name, size, number of blocks, offset, etc., of each of the files. The LTFS Index may also store the wrap and LPOS information of each of the files (specific data), and therefore positional information of the various files on the tape may be gleaned from the LTFS Index and used accordingly.

Although error information may be stored, e.g., using memory and/or tape maps in tape drives 814, as previously mentioned, conventional products are unable to effectively identify areas in which a magnetic tape is damaged. In sharp contrast, various embodiments included herein introduce efficient processes for detecting damaged areas on magnetic tape media.

Figure 9A:
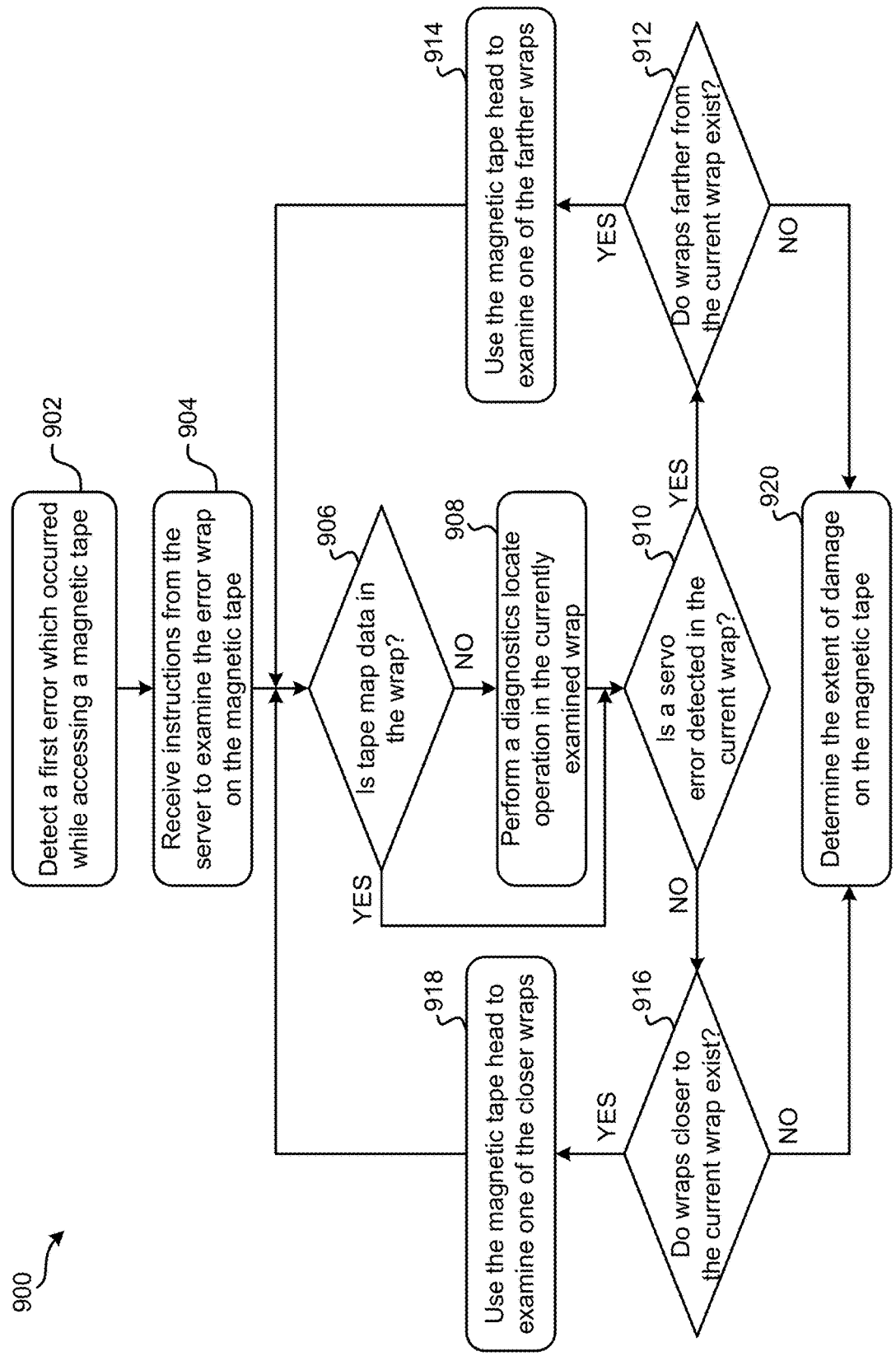
FIG. 9A is a flowchart of a method, according to one embodiment.

Looking specifically now to FIG. 9A, there is depicted a method 900 having a number of processes which may be performed by a tape drive to detect a damaged area of a magnetic tape loaded in the tape drive, in accordance with one embodiment. The method 900 may be performed in accordance with the present invention in any of the environments depicted in FIGS. 1-8, among others, in various embodiments. Of course, more or less operations than those specifically described in FIG. 9A may be included in method 900, as would be understood by one of skill in the art upon reading the present descriptions.

Each of the steps of the method 900 may be performed by any suitable component of the operating environment. Moreover, in various embodiments, the method 900 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9A, operation 902 of method 900 includes detecting a first error which occurred while accessing a magnetic tape. Moreover, the location at which the first error occurred (also referred to as the "first error location") is preferably determined by the tape drive, e.g., from servo information read from a servo track by a servo reader on a magnetic head of the tape drive.

The first error location is preferably sent to a server which is in communication with the tape drive. Accordingly, operation 904 includes receiving instructions from the server to examine a wrap of the data track on the magnetic tape in which the first error location is found (also referred to as the "error wrap"). Upon receiving the instructions from the server, the tape drive may use a magnetic head of the tape to examine the error wrap. Accordingly, the tape drive may actively unwind the magnetic tape from the supply reel or wind the magnetic tape back onto the supply reel such that a magnetic head of the tape drive is positioned about adjacent (e.g., above) the first error location. Moreover, the tape drive may use coarse and/or fine actuators in order to adjust the lateral position (in the cross-track direction) of the magnetic head relative to the magnetic tape.

As alluded to above, a tape drive may include memory on which a tape map may be stored. This information corresponding to errors which have occurred on the magnetic tape may be used to determine whether the magnetic tape itself is damaged. Accordingly, decision 906 includes determining whether tape map data is stored in the currently examined wrap on the magnetic tape. In other words, decision 906 may include determining whether tape-based operations (e.g., read, write, locate, etc.) have already been performed in the error wrap on a first pass, with the potential of being repeated for additional wraps of the magnetic tape, e.g., as will soon become apparent. Similarly, decision 906 may include determining whether error information corresponding to the currently examined wrap has already been added to the tape map as a result of performing tape-based operations prior to experiencing the first error.

In response to determining that tape-based operations have not been performed in the currently examined wrap, it follows that alternative steps are taken in order to determine whether the magnetic tape is damaged at or near the location of the first error location. Accordingly, method 900 proceeds to operation 908 which includes performing a diagnostics locate operation in the currently examined wrap.

The tape drive may perform the diagnostics locate operation by investigating tape servo errors around the first error location. According to some approaches, the tape drive may first perform a diagnostics locate operation on an area in the error wrap and ahead of (closer to an end of the magnetic tape) the first error location. This diagnostics locate operation is not a conventional SCSI command operation, but rather a form of locate operation which is internally processed by the tape drive. Unlike a conventional SCSI locate command operation which locates to an area of data on the basis of a record number, the diagnostics locate operations as used herein may record servo errors according to any of the approaches described herein, while rapidly moving (e.g., advancing) the magnetic tape on the basis of LPOS while limiting error recovery procedures (ERP). The range (e.g., area) of the magnetic tape over which the diagnostics locate operation is performed may vary depending on the type of error initially detected by the tape drive, a number of servo errors detected by the tape drive, user input, etc., e.g., as will be described in further detail below.

Whether the servo errors are detected while performing the diagnostics locate operation or accessed from the tape map, a number of servo errors experienced is compared to an error threshold value which may be set by a user, based on a generation of the magnetic tape, length of the magnetic tape, environmental conditions, etc. Should the number of detected servo errors exceed the corresponding error threshold value, the corresponding area of the magnetic tape may be classified as being damaged. It should be noted that in some approaches, even a single servo error may cause the error threshold value to be exceeded. Accordingly, decision 910 includes determining whether a servo error has been detected in (e.g., determined to be located in) the currently examined wrap, or at least a portion of the wrap examined. It follows that decision 910 may be performed by inspecting a result of the diagnostics locate operation performed.

In response to determining that a servo error has been detected in the examined portion of a wrap, the portion (e.g., area) of the wrap examined is preferably identified as being damaged. According to some approaches, a portion of the magnetic tape may be identified as being damaged by setting one or more flags corresponding thereto. Moreover, when a wrap of the magnetic tape is determined as being damaged, additional areas on the magnetic tape are also preferably examined in order to determine the extent of the damage on the magnetic tape. According to some illustrative approaches, the extent of the damage on the magnetic tape may be determined by examining outermost wraps (along the cross-track direction) in the same data band as the error wrap. If the outermost wraps are determined to be damaged as well, wraps in adjacent data tracks may also be examined. However, if the outermost wraps are determined to not be damaged, then wraps closer to the error wrap may be examined in a systematic manner to determine the outer boundary of the damaged region of the magnetic tape.

Accordingly, method 900 proceeds to decision 912 in response to determining that a servo error has been detected in the currently examined wrap. There, decision 912 includes determining whether wraps of the magnetic tape located farther away from the currently examined wrap along the cross-track direction are available to be examined. This determination may be made by accessing a tape map, physically inspecting the magnetic tape with a magnetic head of the tape drive, etc. In response to determining that at least one additional wrap of the magnetic tape is available to be examined and has not yet been examined, method 900 proceeds to operation 914. Operation 914 includes using the magnetic tape head to examine one of the additional farther wraps determined to be available in decision 912. Depending on the approach, the tape drive may begin by examining an outermost one of the wraps according to any of the approaches described herein. For instance, a relative position of the magnetic tape relative to the magnetic head of the tape drive may be adjusted such that the magnetic head is able to examine the outermost one of the wraps to determine one or more areas on the magnetic tape to be examined.

Referring still to FIG. 9A, method 900 returns to decision 906 from operation 914, whereby any one or more of processes 906, 908, and 910 may be repeated for the wrap examined by the tape drive in operation 914. Moreover, returning to decision 910, the method 900 proceeds to decision 916 in response to determining that a servo error (e.g., a number of servo errors less than a predefined threshold) has not been detected by the tape drive in the currently examined wrap. There, decision 916 includes determining whether a wrap located closer to the error wrap than the previously examined wrap exists. In other words, because a servo error was not detected in the previously examined wrap of the magnetic tape, decision 916 determines whether there are any wraps closer to the error wrap to examine in order to more accurately define an outer boundary of the damaged area on the magnetic tape. Again, the tape drive may make this determination by referencing a tape map, physically inspecting the magnetic tape, evaluating positional information corresponding to a current position of the magnetic head, etc.

Method 900 proceeds to operation 918 in response to determining that a wrap located closer to the error wrap than the previously examined wrap does exist. There, operation 918 includes using the magnetic tape head to examine one of the additional closer wraps determined in decision 916, e.g., according to any of the approaches included herein. From operation 918, method 900 returns to decision 906, whereby any one or more of processes 906, 908, and 910 may be repeated for the wrap examined in operation 918.

Looking again to decisions 912 and 916, method 900 may advance to operation 920 when the extent of the damage on the magnetic tape has been determined at least to an acceptable extent. For instance, in response to determining that a servo error is detected in the most recently examined wrap of the magnetic tape in decision 910, and determining in decision 912 that there are no other wraps which are farther from the error wrap (and in the same data band) than the most recently examined wrap, method 900 may conclude that the entire data band on which the error wrap is located is damaged. Conversely, in response to determining that a servo error is not detected in the most recently examined wrap of the magnetic tape in decision 910, and determining in decision 916 that there are no other wraps which are closer to the error wrap than the most recently examined wrap, method 900 may conclude that the damaged area has been sufficiently defined.

Accordingly, operation 920 includes determining the extent of damage on the magnetic tape. The extent of damage (e.g., "damaged area") may be defined in the cross-track direction and/or the longitudinal direction. For instance, the damaged area may be defined in a two-dimensional manner as extending across a number of wraps as well as a range of LPOS values. Although not shown in the present embodiment, additional processes may be performed. For instance, upon determining the extent of damage on the magnetic tape, a summary of the damage may be sent to the server and/or a user, values may be stored in memory of the tape drive and/or the tape cartridge, the damaged area of the magnetic tape may be marked as being unusable in memory and/or on the magnetic tape itself, etc.

Accordingly, the processes included in method 900 may be implemented by a tape drive in order to efficiently, and accurately determine the extent of damage on a magnetic tape loaded in the tape drive.

However, it should be noted that although various ones of the processes described in FIG. 9A have been in the context of being executed by a tape drive, any one or more of these processes may be performed from the server side. For example, a server may be configured to issue commands to a tape drive in order to cause the tape drive to execute any one or more of the processes included in FIG. 9A and/or portions thereof. Accordingly, the server may determine the inspection ranges in which diagnostics locate operations are to be performed, and convey those ranges to the tape drive which actually performs the diagnostics locate operations. The tape drive may then return the results of the diagnostics locate operations to the server, which may then evaluate (e.g., judge) the identified damaged area(s) of the magnetic tape based on the inspection results.

Figure 9B:
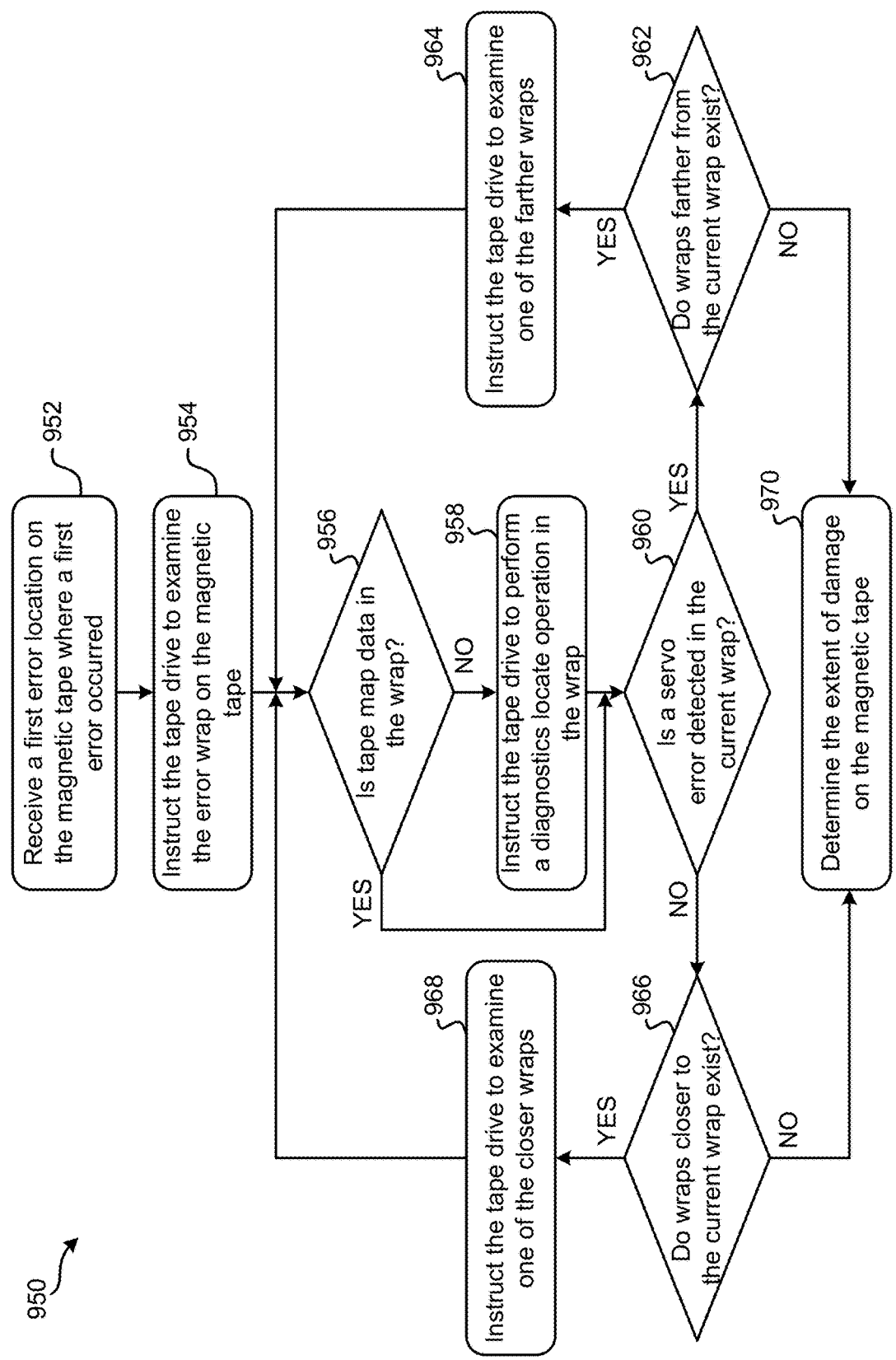
FIG. 9B is a flowchart of a method, according to one embodiment.

Accordingly, looking specifically now to FIG. 9B, a flowchart of a high-level method 950 for detecting a damaged area of a magnetic tape loaded in a tape drive is shown according to one embodiment. The method 950 may be performed in accordance with the present invention in any of the environments depicted in FIGS. 1-8, among others, in various embodiments. Of course, more or less operations than those specifically described in FIG. 9B may be included in method 950, as would be understood by one of skill in the art upon reading the present descriptions.

Each of the steps of the method 950 may be performed by any suitable component of the operating environment. For example, one or more of the processes included in method 950 may be performed by a controller in a server which is electrically coupled to a tape drive, e.g., as seen in system 800 of FIG. 8 above. Moreover, in various embodiments, the method 950 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 950. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9B, operation 952 of method 950 includes receiving a first error location on the magnetic tape where a first error occurred. According to some approaches, the first error location may be received from a tape drive in response to the tape drive experiencing the occurrence of the first error. The first error location may be determined by the tape drive from servo information read from a servo track by a servo reader on a magnetic head of the tape drive, e.g., as described above. Moreover, the first error may be a read error and/or a write error depending on the situation.

Operation 954 further includes instructing the tape drive to examine a wrap of the data track on the magnetic tape in which the first error location is included. It should be noted that, in the interest of simplicity, the wrap of the magnetic tape in which the first error location is located may be referred to herein as the "error wrap". A magnetic head of the tape drive is preferably used to examine the error wrap. Accordingly, instructions may be sent to the tape drive to unwind the magnetic tape from the supply reel or wind it back onto the supply reel such that a magnetic head of the tape drive is positioned about adjacent (e.g., above) the first error location. Moreover, instructions may be sent to activate coarse and/or fine actuators in the tape drive in order to adjust the lateral position (in the cross-track direction) of the magnetic head relative to the magnetic tape.

As alluded to above, a tape drive may include memory on which a tape map may be stored. The tape map preferably stores servo errors (e.g., such as PES) which are generated during read and/or write operations performed on the magnetic tape. Moreover, temporary read and/or write errors may be recorded on a tape-area basis. This information corresponding to errors which have occurred on the magnetic tape may be used to determine whether the magnetic tape itself is damaged. Accordingly, decision 956 includes determining whether tape map data is in the currently examined wrap on the magnetic tape. In other words, decision 956 includes determining whether tape-based operations (e.g., read, write, locate, etc.) have already been performed in the error wrap on a first pass, with the potential of being repeated for additional wraps of the magnetic tape, e.g., as will soon become apparent. Similarly, decision 956 may include determining whether error information corresponding to the currently examined wrap has already been added to the tape map as a result of performing tape-based operations.

In response to determining that tape-based operations have not been performed in the currently examined wrap, it follows that alternative steps must be taken in order to determine whether the magnetic tape is damaged at or near the location of the first error location. Accordingly, method 950 proceeds to operation 958 which includes instructing the tape drive to perform a diagnostics locate operation in the currently examined wrap.

The tape drive, having received the diagnostics locate command, may investigate tape servo errors around the first error location. According to some approaches, the tape drive may first perform a diagnostics locate operation on an area in the error wrap and ahead of (closer to an end of the magnetic tape) the first error location. This diagnostics locate operation is not a conventional SCSI command operation, but rather a form of locate operation which is internally processed by the tape drive. Unlike a conventional SCSI locate command operation which locates to an area of data on the basis of a record number, the diagnostics locate operations as used herein may record servo errors while rapidly moving (e.g., advancing) the magnetic tape on the basis of LPOS while limiting error recovery procedures (ERP). Recording servo errors using a diagnostics locate operation may first include reading the servo patterns in servo bands on a magnetic tape using servo transducers (readers) on a magnetic head. Moreover, the servo transducers (readers) may provide a signal resulting from reading the servo patterns as an input to various logic circuits and/or similar processing components (e.g., such as a processor) which may be used to evaluate the signal and detect any errors which may have resulted while reading the servo pattern. The range (e.g., area) of the magnetic tape over which the diagnostics locate operation is performed may vary depending on the type of error initially detected, a number of servo errors detected, user input, etc., e.g., as will be described in further detail below.

Whether the servo errors are detected while performing the diagnostics locate operation or accessed from the tape map, a number of servo errors experienced is compared to an error threshold value which may be set by a user, based on a generation of the magnetic tape, length of the magnetic tape, environmental conditions, etc. Should the number of detected servo errors exceed the corresponding error threshold value, the corresponding area of the magnetic tape may be classified as being damaged. It should be noted that in some approaches, even a single servo error may cause the error threshold value to be exceeded. Accordingly, decision 960 includes determining whether a servo error has been detected in (e.g., determined to be located in) the currently examined wrap, or at least a portion of the wrap examined.

As mentioned above, in response to determining that a servo error has been detected in the examined portion of a wrap, the portion (e.g., area) of the wrap examined is preferably identified as being damaged. According to some approaches, a portion of the magnetic tape may be identified as being damaged by setting one or more flags corresponding thereto, e.g., as will be described in further detail below. Moreover, when a wrap of the magnetic tape is determined as being damaged, additional areas on the magnetic tape are also preferably examined in order to determine the extent of the damage on the magnetic tape. According to some illustrative approaches, the extent of the damage on the magnetic tape may be determined by examining outermost wraps (along the cross-track direction) in the same data track as the error wrap. If the outermost wraps are determined to be damaged as well, wraps in adjacent data tracks may also be examined. However, if the outermost wraps are determined to not be damaged, then wraps closer to the error wrap may be examined in a systematic manner to determine the outer boundary of the damaged region of the magnetic tape.

Accordingly, method 950 proceeds to decision 962 in response to determining that a servo error has been detected in the currently examined wrap. There, decision 962 includes determining whether wraps of the magnetic tape located farther away from the currently examined wrap along the cross-track direction are available to be examined. In response to determining that at least one additional wrap of the magnetic tape is available to be examined and has not yet been examined, method 950 proceeds to operation 964. There, operation 964 includes instructing the tape drive to examine one of the additional wraps determined to be available in decision 962. Depending on the approach, the instructions sent to the tape drive in which the magnetic tape is loaded may correspond to examining the outermost one of the wraps according to any of the approaches described herein. For instance, a relative position of the magnetic tape relative to a magnetic head of the tape drive may be adjusted such that the magnetic head is able to examine the outermost one of the wraps to determine one or more areas on the magnetic tape to be examined.

Referring still to FIG. 9B, method 950 returns to decision 956 from operation 964, whereby any one or more of processes 956, 958, and 960 may be repeated for the wrap examined in operation 964. Moreover, returning to decision 960, the method 950 proceeds to decision 966 in response to determining that a servo error (e.g., a number of servo errors less than a threshold) has not been detected in the currently examined wrap. There, decision 966 includes determining whether a wrap located closer to the error wrap than the previously examined wrap exists. In other words, because a servo error was not detected in the previously examined wrap of the magnetic tape, decision 966 determines whether there are any wraps closer to the error wrap to examine in order to more accurately define an outer boundary of the damaged area on the magnetic tape.

Method 950 proceeds to operation 968 in response to determining that a wrap located closer to the error wrap than the previously examined wrap does exist. There, operation 968 includes sending instructions to the tape drive to examine the wrap determined in decision 966, e.g., according to any of the approaches included herein. From operation 968, method 950 returns to decision 956, whereby any one or more of processes 956, 958, and 960 may be repeated for the wrap examined in operation 968.

Looking again to decisions 962 and 966, method 950 may advance to operation 970 when the extent of the damage on the magnetic tape has been determined at least to an acceptable extent. For instance, in response to determining that a servo error is detected in the most recently examined wrap of the magnetic tape in decision 960, and determining in decision 962 that there are no other wraps which are farther from the error wrap (and in the same data band) than the most recently examined wrap, method 950 may conclude that the entire data band on which the error wrap is located is damaged. Conversely, in response to determining that a servo error is not detected in the most recently examined wrap of the magnetic tape in decision 960, and determining in decision 966 that there are no other wraps which are closer to the error wrap than the most recently examined wrap, method 950 may conclude that the damaged area has been sufficiently defined.

Accordingly, operation 970 includes determining the extent of damage on the magnetic tape. The extent of damage (e.g., "damaged area") may be defined in the cross-track direction and/or the longitudinal direction. For instance, the damaged area may be defined in a two-dimensional manner as extending across a number of wraps as well as a range of LPOS values. Although not shown in the present embodiment, additional processes may be performed. For instance, upon determining the extent of damage on the magnetic tape, a summary of the damage may be sent to a user, values may be stored in memory, the damaged area of the magnetic tape may be marked as being unusable, etc.

It follows that various ones of the processes included in method 950 may be implemented in order to efficiently, and accurately determine the extent of damage on a magnetic tape loaded in a tape drive. Looking now to FIG. 10, method 1000 provides a more detailed account of the processes which may be implemented for determining a damaged area of a magnetic tape loaded in a tape drive according to one embodiment. The method 1000 may be performed in accordance with the present invention in any of the environments depicted in FIGS. 1-8, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, one or more of the processes included in method 1000 may be performed by a controller in a server which is electrically coupled to a tape drive, e.g., as seen in system 800 of FIG. 8 above. In various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

However, it should also be noted that any one or more of the processes included in method 1000 may also (e.g., alternatively) be performed by the tape drive itself. For example, the tape drive may be programmed to automatically perform operations 1014, 1016, 1018, 1020 and/or 1022 below in response to a predetermined condition being met. According to one example, which is in no way intended to limit the invention, a tape drive may be configured to automatically perform 1014, 1016, 1018, 1020, and 1022 in response to receiving a request from the server to perform a diagnostics locate operation, e.g., as would be appreciated by one skilled in the art after reading the present description.

Figure 10:
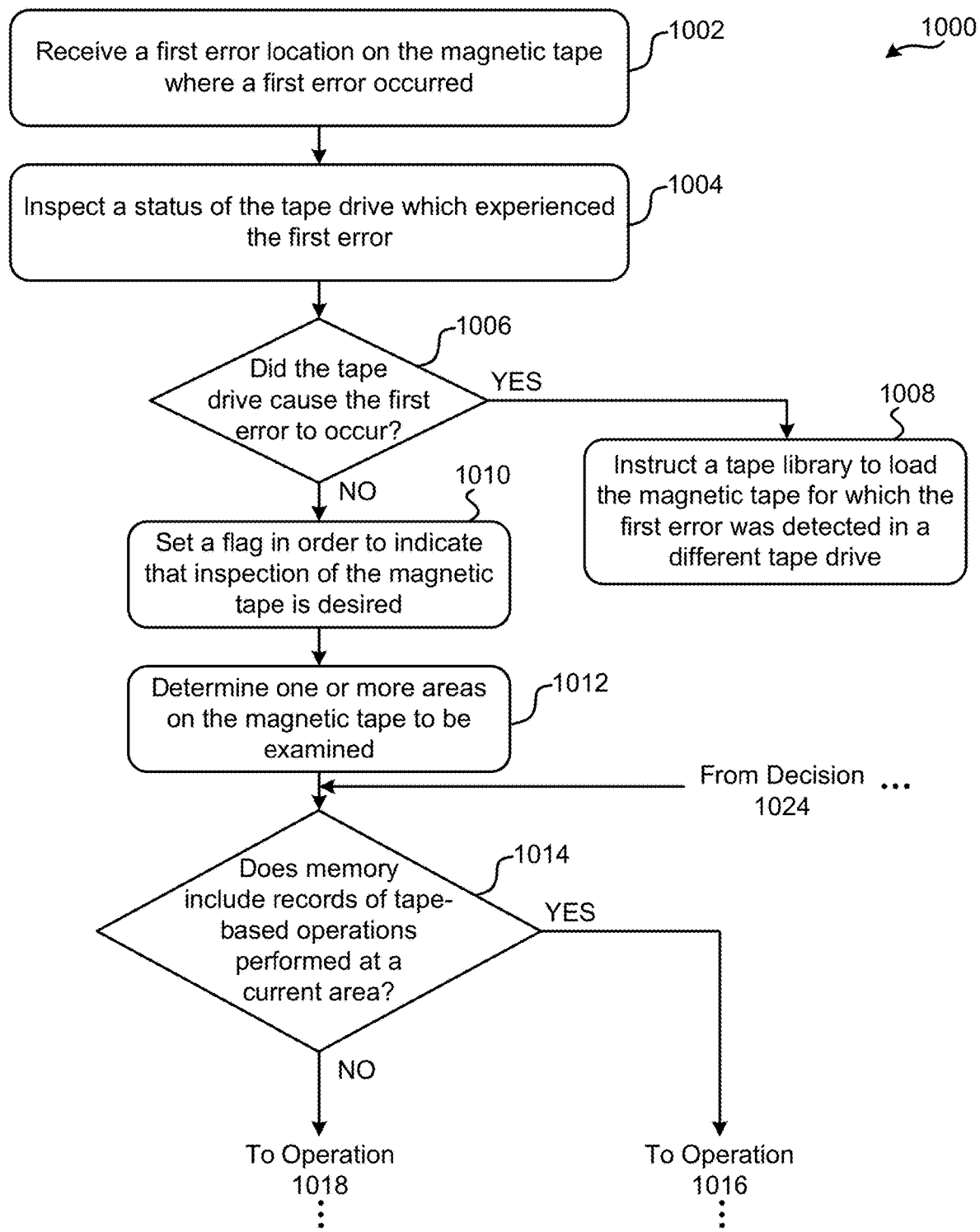
FIG. 10 is a flowchart of a method, according to one embodiment.
Figure 10:
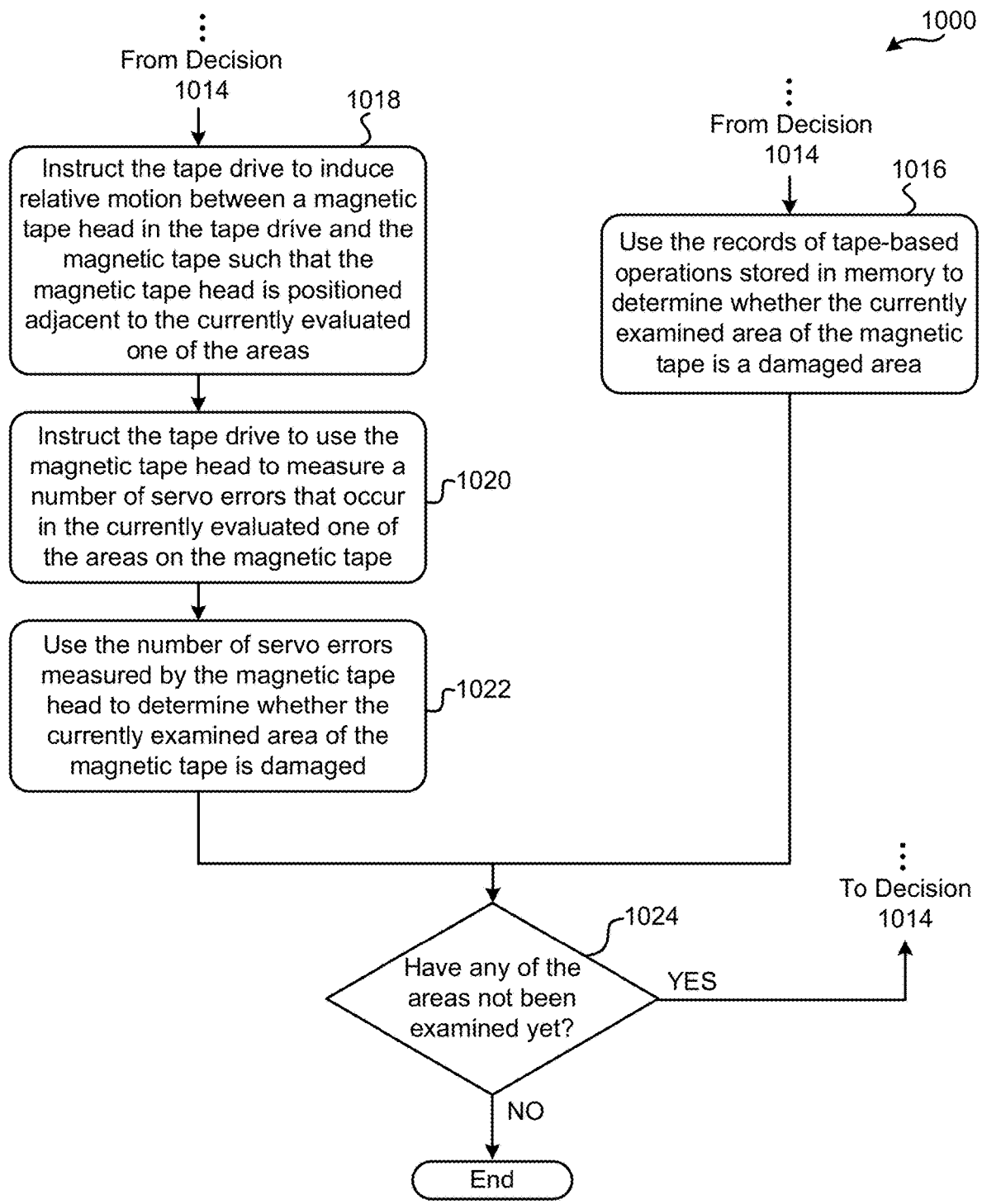

As shown in FIG. 10, operation 1002 of method 1000 includes receiving a first error location on the magnetic tape where a first error occurred. While performing a read and/or write operation in response to receiving an instruction to do so from a server, a tape drive may experience a permanent error. According to some approaches, a permanent error may be caused by servo pattern defects on the magnetic tape, which may ultimately result in servo errors to be concentrated in a specific area along the longitudinal direction of the tape, concentrated in a specific servo band, or spread throughout the data band. In other approaches, a permanent error may result from weak magnetism of a deteriorated tape which causes the servo patterns to be unreadable. For example, specific portions of the servo patterns of magnetic tapes are frequently read when the magnetic tape is loaded (e.g., mounted), and/or data is frequently written near specific portions of the servo patterns. As a result, areas of the magnetic tape near these specific portions of the servo patterns are particularly deteriorated, thereby causing errors to occur around these areas. According to still other approaches, a permanent error may be caused by asperities (e.g., scratches) which form on a surface of the magnetic tape over time and with use.

The location on the magnetic tape at which the permanent error was experienced is identified as the "first error location" and may be used while conducting an examination of the magnetic tape for damage. The first error location may be determined by the tape drive from servo information read from a servo track by a servo reader on a magnetic head of the tape drive, e.g., as described above. Moreover, the first error location may be identified by LPOS information and/or lateral (in the direction perpendicular to the longitudinal direction of the magnetic tape) positioning information, e.g., such as a data band, wrap number, specific data track, etc.

It should be noted that in some approaches the first error location may be received in response to sending a request to the tape drive for it. For example, a server performing one or more of the various processes included in method 1000 may send a request sense command to the tape drive which experienced the first error. In response, the tape drive may return an SCSI Sense Data response to the server, in which positional information of the first error is stored. Accordingly, the server may obtain the positional information of the area where the first error has occurred from the SCSI Sense Data response. Moreover, a flag may be set by the tape drive and included in the SCSI Sense Data response received by the server from the tape drive, e.g., as will be described in further detail below.

Operation 1004 includes inspecting a status if the tape drive which experienced the first error. Although a permanent error may have been experienced while reading from and/or writing to a magnetic tape, the error may not have been caused by a defect on the magnetic tape. Rather, in some approaches the tape drive itself may be damaged, uncalibrated, misoperated, etc. which is ultimately the cause of the permanent error experienced. Accordingly, the tape drive is preferably inspected before time and resources are dedicated to detecting damaged regions on the magnetic tape. In some approaches, a check may be made to see if a channel of the drive is in a normal state. This may be determined at least in part on the basis of a result of a channel calibration operation which may be performed on the tape drive according to any processes which would be apparent to one skilled in the art after reading the present description. For example, a channel calibration operation may be used to determine parameters for adjusting a magnetic head of the tape drive, e.g., based on the actual results of read and/or write operations performed on a magnetic tape. A check may also be made in some approaches to determine if the tape drive has been normally operated. For instance, a tape drive may be identified as operating normally in response to determining that ten or more tapes have been read from and/or written to by the tape drive without experiencing a permanent error prior to the current one. This determination may be based on information stored in memory of the tape drive.

Decision 1006 includes determining whether the tape drive may have caused the first error to occur. In other words, decision 1006 includes determining whether the tape drive has been performing nominally prior to experiencing the first error. In response to determining that the tape drive has not been performing normally and may have caused the first error to occur, method 1000 proceeds to operation 1008 which includes instructing a tape library to load the magnetic tape for which the first error was detected in a different tape drive. By loading the magnetic tape in a different tape drive, read and/or write operations may be resumed without the risk of experiencing additional permanent errors while doing so. Moreover, the tape drive which likely caused the first error to occur is preferably inspected for repair and/or replaced depending on the situation.

It follows that if the tape drive is not experiencing operational errors, the magnetic tape is the desirable place to search for the cause of the first error. Accordingly, returning to decision 1006, method 1000 alternatively proceeds to operation 1010 in response to determining that the tape drive has been performing normally and was not the cause of the first error. Looking to operation 1010, a flag is set in order to indicate that inspection of the magnetic tape is desired. Again, should it be determined that the tape drive did not cause the first error, it is desirable that the magnetic tape itself is inspected. According to an example, a flag may be set in response to receiving a SCSI Sense Data response which indicates that inspection of the tape is possible. As mentioned above, the tape drive may set a flag which is included in the SCSI Sense Data response returned to the server, which the server may then use to set the additional flag in operation 1010. Accordingly, the server may instruct the tape drive to inspect the tape medium by issuing a Send Diagnostics command. In the parameters of the Send Diagnostics command, the server may specify the wrap position and/or LPOS information indicating the location where the first error has occurred.

Operation 1012 includes determining (e.g., actively identifying) one or more areas on the magnetic tape to be examined. As previously mentioned, the magnetic tape may be inspected in order to efficiently and accurately determine an extent of damage thereon according to various ones of the processes included herein. Accordingly, the one or more areas are preferably determined using (e.g., according to) a predetermined algorithm which incorporates the first error location. The predetermined algorithm may include numbered steps which provide an order in which the one or more areas are selected and/or inspected for damage. Moreover, the predetermined algorithm is preferably adaptive and able to provide an output which incorporates the status of previously examined areas of the magnetic tape. For instance, referring momentarily back to the high level description in FIG. 9B, the decisions performed in method 950 cause the flowchart to adapt to different situations depending on whether a particular area of the magnetic tape is determined to be damaged or not. Similarly, referring now momentarily to FIG. 11A, an illustrative description of the predetermined algorithm is provided according to one embodiment. Accordingly, any one or more of the steps included in FIG. 11A may be implemented when determining the one or more areas on the magnetic tape to be examined. Moreover, FIGS. 11B-11C include exemplary processes which may be implemented in correspondence with different ones of the steps included in FIG. 11A. Accordingly, it should be noted that any one or more of the processes introduced in FIGS. 11B-11C may be implemented in order to determine the one or more areas on the magnetic tape to be examined as seen in operation 1012, and/or in order to actually instruct the tape drive to measure a number of servo errors that occur therein as seen in operation 1020 below.

Referring back to FIG. 10, it should be noted that a remainder of the processes are performed on a per-area-basis. In other words, processes 1014, 1016, 1018, 1020, 1022, and 1024 are performed for each of the one or more areas on the magnetic tape to be examined at a time. Accordingly, decision 1014 includes determining whether memory includes records of tape-based operations (e.g., read, write, locate, etc.) performed at a first of the one or more areas on the magnetic tape to be examined. As described above, a tape map may store records of tape-based operations performed on various portions (e.g., loads) of the magnetic tape. Moreover, these records may be used to identify (e.g., flag) areas of the magnetic tape as damaged areas in lieu of inspecting the magnetic tape and determining a number of servo errors separately. Thus, method 1000 proceeds to operation 1016 in response to determining that the memory does include records of tape-based operations performed at the area. There, operation 1016 includes using the records of tape-based operations stored in memory to determine whether the currently examined area of the magnetic tape is a damaged area. Again, it is preferred that identifying an area as a damaged area of the magnetic tape is performed using the records in lieu of using the number of measured servo errors in response to determining that memory (e.g., a tape map) includes the records. By using the records in memory rather than inspecting the area with the magnetic tape head, method 1000 is able to desirably reduce throughput, increase efficiency, reduce run time, etc.

From operation 1016, method 1000 jumps to decision 1024 which determines whether any of the one or more areas on the magnetic tape to be examined have not yet been examined. As shown, the flowchart returns to decision 1014 whereby the determination and subsequent appropriate operations may be repeated for a next one of the areas on the magnetic tape to be examined. However, upon determining that all of the areas on the magnetic tape to be examined have actually been examined, method 1000 may end. It should be noted that in some approaches certain processes included in method 1000 may actually be repeated rather than the flowchart actually ending. For instance, as previously mentioned, a predetermined algorithm may be used to perform various ones of the operations in method 1000. Accordingly, when the processes included in method 1000 are completed for one or more areas of the magnetic tape, the predetermined algorithm may identify additional areas of the magnetic tape to inspect (e.g., examine) depending on whether the previously examined areas are determined to be damaged or not, e.g., as will be described in further detail below.

However, in response to determining that tape-based operations have not been performed in a currently examined area, it follows that alternative steps must be taken in order to determine whether the magnetic tape is damaged at or near the location of the first error location. Accordingly, returning to decision 1014, method 1000 alternatively proceeds to operation 1018 in response to determining that the memory does not include records of tape-based operations performed at a currently evaluated one of the areas on the magnetic tape to be examined. There, operation 1018 includes instructing the tape drive to induce relative motion between a magnetic tape head in the tape drive and the magnetic tape such that the magnetic tape head is positioned adjacent to the currently evaluated one of the areas. It should be noted that the instructions corresponding to operation 1018 are independent of a read and/or write operations which may be performed by the tape drive during normal operation. In other words, instructions sent to the tape drive in correspondence with operation 1018 are preferably irrespective of any outstanding, upcoming, anticipated, past, etc. operations of the tape drive in order to read from the magnetic tape, write to the magnetic tape, locate a different location on the magnetic tape, etc.

Moreover, once positioned about adjacent to the currently evaluated one of the areas on the magnetic tape to be examined, the tape head preferably keeps track of a number of servo errors which occur. Accordingly, operation 1020 includes instructing the tape drive to use the magnetic tape head to measure (e.g., track) a number of servo errors that occur in the currently evaluated one of the areas on the magnetic tape. As described above, a diagnostics locate operation may be performed by the tape drive in order to examine the magnetic tape and determine a number of servo errors corresponding to the area currently examined.

Operation 1022 further includes using the number of servo errors measured by the magnetic tape head to determine whether the currently examined area of the magnetic tape is damaged. For instance, the number of measured servo errors may be compared to an error threshold value, and the currently examined area may be identify (e.g., flag) as a damaged area if the error threshold value is exceeded.

From operation 1022, method 1000 proceeds to decision 1024 which determines whether any of the one or more areas on the magnetic tape to be examined have not yet been examined. As shown, the flowchart returns to decision 1014 whereby the determination and subsequent appropriate operations may be repeated for a next one of the areas on the magnetic tape to be examined. However, upon determining that all of the areas on the magnetic tape to be examined have actually been examined, method 1000 may end. As previously noted, in some approaches certain processes included in method 1000 may actually be repeated rather than the flowchart actually ending. For instance, as previously mentioned, a predetermined algorithm may be used to perform various ones of the operations in method 1000. Accordingly, when the processes included in method 1000 are completed for one or more areas of the magnetic tape, the predetermined algorithm may identify additional areas of the magnetic tape to inspect (e.g., examine) depending on whether the previously examined areas are determined to be damaged or not, e.g., as will be described in further detail below.

Looking now to FIG. 11A, exemplary steps of a predetermined algorithm which may be implemented to efficiently examine a magnetic tape 1100 which has experienced an error are illustrated according to one embodiment. As previously described above, upon experiencing an error on a magnetic tape, one or more areas on the tape are preferably determined using (e.g., according to) a predetermined algorithm which incorporates the location where the error was experienced. The predetermined algorithm may include numbered steps which provide an order in which the one or more areas are selected and/or inspected for damage. Accordingly, any one or more of the steps included in FIG. 11A may be implemented when determining one or more areas on a magnetic tape to be examined, e.g., in response to experiencing an error on the magnetic tape. Moreover, FIGS. 11B-11C include exemplary processes which may be implemented in correspondence with different ones of the predetermined steps included in FIG. 11A. Accordingly, it should be noted that any one or more of the processes introduced in FIGS. 11B-11C may be implemented in order to determine the one or more areas on the magnetic tape to be examined as seen in operation 1012, and/or in order to actually instruct the tape drive to measure a number of servo errors that occur therein as seen in operation 1020, e.g., as will be described in further detail below.

Referring again to FIG. 11A, it should be noted that the predetermined algorithm may be performed in accordance with the present invention in any of the environments depicted in FIGS. 1-8, among others, in various embodiments. Of course, more or less operations than those specifically described in FIG. 11A may be included in predetermined algorithm, as would be understood by one of skill in the art upon reading the present descriptions.

Although the various steps of the predetermined algorithm in FIG. 11A are described below with respect to being performed by a server which is electrically coupled to a tape drive, each of the steps of the predetermined algorithm may be performed by any suitable component of the operating environment. For example, in various embodiments, the predetermined algorithm may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the predetermined algorithm. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11A, the magnetic tape 1100 includes a plurality of data tracks 1102 which are positioned between pairs of servo tracks 1104. Moreover, the data tracks which have data written thereto are represented by crosshatching. It should be noted that although the data tracks 1102 are illustrated as being written in a serpentine fashion, data may be written to the magnetic tape 1100 according to any desired method, e.g., such as in non-serpentine fashion. For reference see FIGS. 13A-13B below which illustrate the difference between serpentine and non-serpentine writing. However, while data was being written to the magnetic tape 1100 in FIG. 11A, a first error 1106 occurred. Accordingly, the predetermined algorithm may be initiated when the error (hereinafter referred to as a "first error") is detected on the magnetic tape 1100. The first error may be detected during a read and/or write operation which may be executed by a server which sends instructions to a tape drive in which the magnetic tape is loaded. As previously mentioned, upon experiencing an error while accessing a magnetic tape, it may be desirable to first inspect the tape drive in order to determine whether the tape drive actually caused the error to occur. Accordingly, in some approaches a channel calibration may be performed on the tape drive. Moreover, a tape drive memory may be accessed in order to determine whether the tape drive has been performing nominally prior to detecting the error.

In response to determining that the tape drive was not the cause of the error, the location at which the first error occurred on the magnetic tape is preferably retrieved from the tape drive. Accordingly, the server may send a request to the tape drive for the first error location, which may be described (e.g., identified) by LPOS information and/or wrap position information. The request sent from the server to the tape drive may be a Request Sense command, and the response received from the tape drive may be a SCSI Sense Data response according to some exemplary approaches. The tape drive may also indicate whether the magnetic tape may actually be inspected, e.g., by setting a flag in the SCSI Sense Data response sent to the server. Thus, upon detecting a flag in the SCSI Sense Data response indicating that inspection of the magnetic tape is possible, the server may send a diagnostics command to the tape drive in which the server may specify the wrap position and/or LPOS information indicating the location where the first error has occurred.

Upon receiving the diagnostics command from the server, the tape drive begins investigating the tape servo errors around the location where the first error occurred. See step 1 in FIG. 11A. An error threshold value for the number of servo errors which are detected within a given area of the magnetic tape may be set, predetermined, calculated on the fly, etc., depending on the desired approach. The error threshold value may be defined to represent an acceptable value of the number of servo errors that are detected.

Upon determining an "edge" surrounding the first error 1106 location where the error threshold value is met, the predetermined algorithm may proceed to step 2, which includes performing a diagnostics locate operation. The tape drive preferably performs the diagnostics locate operation on an area of the magnetic tape ahead (i.e., in a forward read/write direction along the longitudinal direction 1108 towards an end of the tape) of the first error location. Accordingly, the predetermined algorithm includes performing a diagnostics locate operation in a forward direction along the longitudinal direction 1108 towards an end of the tape as represented by the dashed arrow 2.

This diagnostics locate operation may not be a SCSI command operation, but rather a kind of locate operation, which may be internally processed by the tape drive. Unlike a normal SCSI locate command operation, which locates to the area of data on the basis of a record number, the diagnostics locate operation records servo errors while rapidly moving the tape on the basis of LPOS and limiting ERP, e.g., as previously mentioned.

Again, the range over which the diagnostics locate operation is preferably performed begins at a start LPOS where the number of servo errors has decreased less than or equal to the threshold number, and extends to a position a predetermined number of LPOS units towards the end of tape. The predetermined number of LPOS units may vary depending on the approach. For example, the predetermined number of LPOS units may be an LPOS number corresponding to six regions in a tape map, e.g., as would be appreciated by one skilled in the art after reading the present description.

However, it should be noted that if a tape map includes records of actual read, write, locate, etc. operations performed in the present load by the tape drive, the tape map records may be used as servo error information in the region accessed by those operations rather than performing a diagnostics locate operation for the region. In such instances, a region may be determined to be a damaged area in response to the number of servo errors in the region being greater than an error threshold value. Moreover, as to the region located adjacent to the boundary of the area that is determined as a damaged area using the tape map records, a diagnostics locate operation may be performed to determine the LPOS area. Accordingly, although various ones of the steps included in the predetermined algorithm are described in the present embodiment as including performing one or more diagnostics locate operations, records stored in one or more tape maps may similarly (e.g., alternatively) be used to achieve similar results. In other words, tape map information may be substituted for information to be obtained by a diagnostics locate operation, e.g., as would be appreciated by one skilled in the art after reading the present description. However, it should be noted that tape maps may be deleted from the tape drive memory in some approaches when the tape is unloaded or a tape is loaded. Moreover, when an error-occurring LPOS area is narrower than a region used in the tape map, the error-occurring LPOS area may not be identified using the tape map information, and therefore diagnostics locate operations may be performed.

Figure 11B:
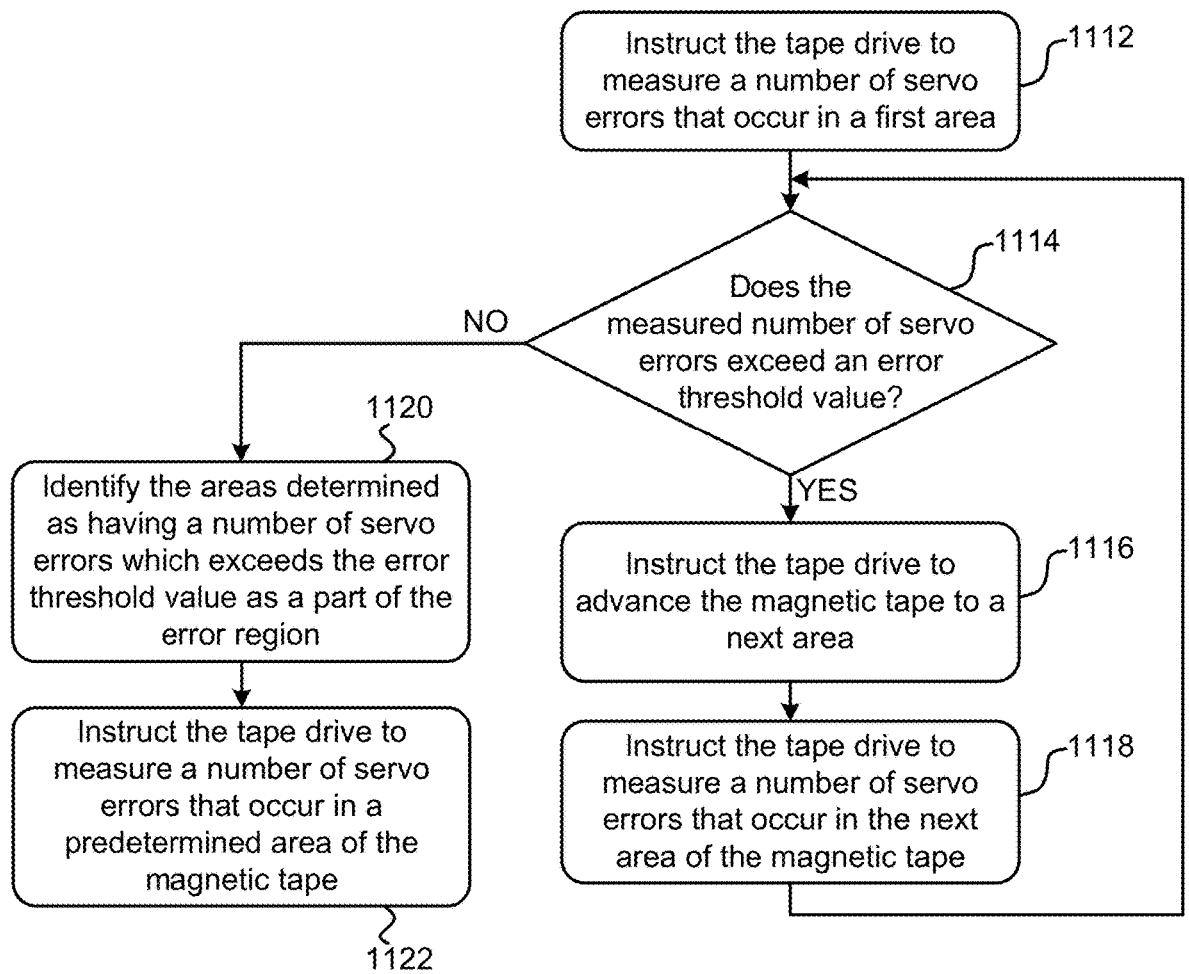
FIG. 11B is a flowchart of processes included in the predetermined algorithm of FIG. 11A, according to one embodiment.

Referring momentarily now to FIG. 11B, exemplary sub-operations of performing the first and second steps of the predetermined algorithm are illustrated in accordance with one embodiment, one or more of which may be used to perform steps 1 and/or 2 of FIG. 11A. However, it should be noted that the sub-operations of FIG. 11B are illustrated in accordance with one embodiment which is in no way intended to limit the invention.

As shown in FIG. 11B, sub-operation 1112 includes instructing the tape drive to measure (e.g., store) a number of servo errors that occur in a first area. Upon experiencing an error on the magnetic tape, one or more areas on the magnetic tape may preferably be examined to determine an extent of damage, a cause of the error, a status of the magnetic tape, etc. One of the areas which is preferably examine includes a "first area" which is located adjacent to an area containing the first error location, and in a same wrap of the magnetic tape as the area containing the first error location.

Moreover, decision 1114 includes determining whether the number of servo errors measured in the area of magnetic tape exceeds an error threshold value. As mentioned above, the error threshold value may represent an acceptable value of the number of servo errors that are detected. Thus, when the number of servo errors measured in the first area exceeds an error threshold value, an unacceptable number of errors have been detected on the magnetic tape, and an iterative process may be performed.

Accordingly, the flowchart of FIG. 11B proceeds to sub-operation 1116 in response to determining that the number of servo errors measured in the first area exceeds the error threshold value, where sub-operation 1116 includes instructing the tape drive to advance the magnetic tape such that a next area on the magnetic tape is accessible to a magnetic head of the tape drive. According to the present description, the "next area" on the magnetic tape is located longitudinally adjacent to a previously measured area of the magnetic tape determined to have a number of servo errors which exceeded the error threshold value. Moreover, the "next area" is preferably located closer to an end of the magnetic tape than the previously measured area of the magnetic tape. Thus, sub-operation 1116 effectively includes progressing along the forward direction (towards an end of tape) by one unit, such that a next area of the magnetic tape may be inspected for a corresponding number of servo errors.

Thus, sub-operation 1118 includes instructing the tape drive to measure (e.g., store) a number of servo errors that occur in the next area of the magnetic tape. Moreover, from sub-operation 1118, the flowchart of method 11B returns to decision 1114, whereby it may again be determined whether the number of servo errors measured in the next area exceeds an error threshold value. It follows that sub-processes 1114, 1116, 1118 may be repeated in an iterative fashion for each area of the magnetic tape until it is determined that the number of servo errors measured in a given area of the magnetic tape does not exceed the error threshold value. In other words, the iterative process of repeating sub-processes 1114, 1116, 1118 may go on until the number of servo errors that occur in a given area on the magnetic tape does not exceed the error threshold value, whereby the iterative process may be terminated, and the flowchart proceeds to sub-operation 1120.

There, sub-operation 1120 includes identifying the areas determined as having a number of servo errors which exceeds the error threshold value as a part of the error region. Moreover, sub-operation 1122 includes instructing the tape drive to measure a number of servo errors that occur in a predetermined area of the magnetic tape. According to sub-operation 1122, the predetermined area preferably begins at an area which is next to an area of the magnetic tape at which the iterative process was terminated, and progresses a predetermined distance along a longitudinal direction of the magnetic tape toward an end of tape (see step 2 in FIG. 11A). The number of errors which are measured during sub-operation 1122 may be further evaluated according to various approaches, and may be stored for future use. Accordingly, the measured number of errors may be sent back from the tape drive to the server, e.g., in response to receiving a request to do so.

Returning to FIG. 11A, after the diagnostics locate operation is performed in a forward direction along the data track in which the first error is located (also referred to herein as the "first error track" or "the first error wrap"), towards an end of the tape as represented by the dashed arrow 2, the predetermined algorithm next includes performing another diagnostics locate operation. Step 3 of the predetermined algorithm includes performing a diagnostics locate operation in a data track directly adjacent to the first error track which includes the first error location, as represented by the dashed arrow 3. Although step 3 is shown in the present embodiment as being performed directly below the first error location along the cross-track direction 1110, in other approaches step 3 may be performed in the data track directly above the first error track.

It is preferred that the diagnostics locate operation is performed in the backward direction (towards a beginning of tape) along the longitudinal direction 1108, e.g., in order to investigate areas located before the LPOS where the first error occurred. In other words, it is desirable that the magnetic head reads the logical data corresponding to the adjacent track in a reverse direction. Accordingly, the tape may be investigated while running the magnetic tape in the backward direction (from take-up reel to supply reel) while employing normal read, write, locate, etc., operations. In some approaches the information gathered while performing the diagnostics locate operation may be rearranged such that it is not processed in a reverse order. However, in some instances the tape drive may not be able to perform locate operations in the logical reverse direction. Accordingly, in some approaches step 3 may alternatively be performed by rewinding the magnetic tape back onto the supply reel such that the diagnostics locate operation is performed in the forward direction (towards the end of tape).

The range over which the diagnostics locate operation in step 3 is performed may vary depending on the desired approach. For instance, step 3 is shown in FIG. 11A as beginning at an LPOS where step 2 ended (a tail of dashed arrow 3 is aligned with the head of dashed arrow 2 along the cross-track direction 1110). However, in other approaches step 3 may begin at a start LPOS where the number of servo errors has decreased less than or equal to the threshold number, e.g., as mentioned above. In other words, step 3 may begin at an edge of the extents determined in step 1. Moreover, step 3 preferably extends a predetermined number of LPOS units towards the beginning of tape, which may vary depending on the approach. For example, the predetermined number of LPOS units may be an LPOS number corresponding to six regions in a tape map, e.g., as would be appreciated by one skilled in the art after reading the present description.

Figure 11C:
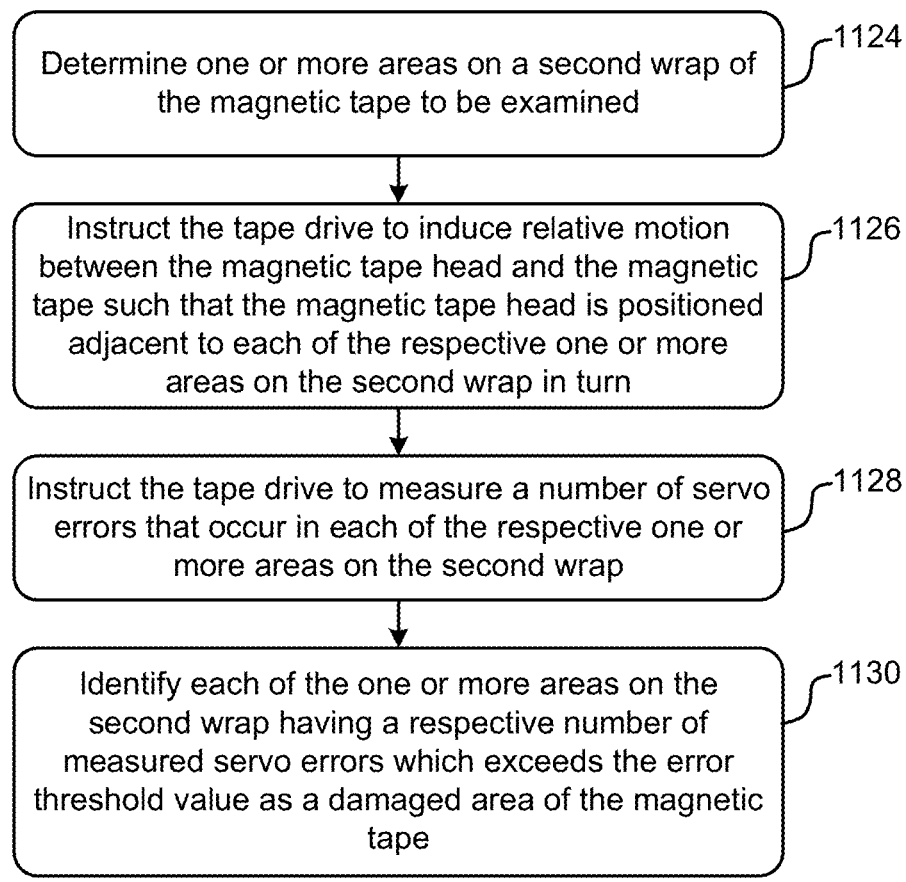
FIG. 11C is a flowchart of processes included in the predetermined algorithm of FIG. 11A, according to one embodiment.

Referring momentarily now to FIG. 11C, exemplary sub-operations of performing the third step of the predetermined algorithm are illustrated in accordance with one embodiment, one or more of which may be used to perform step 3 of FIG. 11A. However, it should be noted that the sub-operations of FIG. 11C are illustrated in accordance with one embodiment which is in no way intended to limit the invention.

As shown in FIG. 11C, sub-operation 1124 includes determining (e.g., actively identifying) one or more areas on a second wrap of the magnetic tape to be examined. As described above, step 3 of the predetermined algorithm includes performing a diagnostics locate operation in a second data track (also referred to herein as a "wrap" of the magnetic tape) directly adjacent to the first error track. Accordingly, sub-operation 1124 preferably includes determining one or more areas to examine in the second data track directly adjacent to the first error track (e.g., see 1106 in FIG. 11A).

Sub-operation 1126 further includes instructing the tape drive to induce relative motion between the magnetic tape head and the magnetic tape such that the magnetic tape head is positioned adjacent to each of the respective one or more areas on the second wrap in turn. In other words, sub-operation 1126 includes instructing the tape drive to move the magnetic head over the one or more areas on the second wrap determined in sub-operation 1124, e.g., such that the magnetic head may measure a number of servo errors which occur therein. Moreover, the relative motion induced between the magnetic head and the magnetic tape is such that the magnetic head moves in a backward direction (towards a beginning of tape). However, in other approaches the relative motion may be such that the magnetic head moves in a forward direction (towards the end of tape).

It should also be noted that the instructions corresponding to sub-operation 1126 are preferably sent independent of a read and/or write operation. In other words, the relative motion induced as a result of the instructions sent in sub-operation 1126 is distinct from any motion of the tape induced by "normal" read and/or write operations. Accordingly, in some approaches the instructions may be sent with a unique indication that the requested motion is independent of any "normal" tape drive operations.

The flowchart of FIG. 11C further includes instructing the tape drive to measure (e.g., store) a number of servo errors that occur in each of the respective one or more areas on the second wrap. See sub-operation 1128. It follows that the tape drive preferably uses the magnetic head to perform sub-operation 1128 in response to receiving the instructions to do so. Furthermore, sub-operation 1130 includes identifying (e.g., flagging) each of the one or more areas on the second wrap having a respective number of measured servo errors which exceeds the error threshold value as a damaged area of the magnetic tape. Depending on the desired approach, certain areas of the second wrap may be identified as being damaged by flagging them in memory (e.g., a cartridge memory), physically writing bursts to the magnetic tape, informing a tape library administrator, etc.

Returning again to FIG. 11A, after the diagnostics locate operation is performed (as represented by the dashed arrow 3) in a backward direction along the second data track directly adjacent to the first error track, the predetermined algorithm may next include performing another diagnostics locate operation. However, the following diagnostics locate operation may be performed at different wraps of the magnetic tape depending on a result of step 3 above. For instance, if occurrence of server errors is determined to be limited to a certain LPOS range in step 3, and/or the total number of servo errors is determined to exceed the error threshold value, another diagnostics locate operation is preferably performed on a wrap which is farthest from the first error wrap, but also located in a same data band as the first error wrap. See step 4. By doing so, the predetermine algorithm is attempting to determine an outer extent of the damage on the magnetic tape. As described above, the extent of the damage on the magnetic tape may be determined by examining outermost wraps (along the cross-track direction) in the same data track as the first error wrap. If the outermost wraps are determined to be damaged as well, wraps in adjacent data bands may also be examined. However, if the outermost wraps are determined to not be damaged, then wraps closer to the first error wrap may be examined in a systematic manner to determine the outer boundary of the damaged region of the magnetic tape, e.g., as will be described in further detail below.

The actual processes included in performing step 4 may follow those illustrated in FIG. 11C. Accordingly, the processes involved with performing step 3 may be the same or similar to those involved with performing step 4 of the predetermined algorithm. However, it should be noted that step 4 is performed in a forward direction (towards an end of tape), while step 3 is performed in a backward direction (towards a beginning of tape). Accordingly, the instructions sent to the tape drive to induce the relative motion between the magnetic tape and the magnetic head may differ in that regard according to some approaches. Moreover, although step 4 is performed in a physical forward direction (towards the end of tape), it may actually be performed in a logical reverse direction depending on which direction the data was written to the magnetic tape. For instance, data may be written to data tracks at the bottom of the data band from the end of tape towards the beginning of tape while data is written to the data tracks at the top of the same data band in a forward direction according to a serpentine writing scheme (e.g., see FIG. 13B below). Thus, step 4 may actually read the data in a backward direction compared to the direction in which it was written to the magnetic tape although the magnetic head is traveling in a forward direction (towards the end of tape). Moreover, this may be similarly true for other ones of the steps included in the predetermined algorithm depending on the approach as would be appreciated by one skilled in the art after reading the present description. Furthermore, in some approaches step 4 may record servo errors for an LPOS range which is wider than the LPOS range implemented in step 3, e.g., by a number of LPOS units which is predetermined, calculated on the fly, input by the user, etc.

Following step 4, the predetermined algorithm may perform yet another diagnostics locate operation. However, as previously mentioned, the subsequent diagnostics locate operation may be performed at different wraps of the magnetic tape depending on a result of step 4 above. Once again, the extent of the damage on the magnetic tape may be determined by examining outermost wraps (along the cross-track direction) in the same data track as the first error wrap. If the outermost wraps are determined to be damaged as well, wraps in adjacent data bands may also be examined. However, if the outermost wraps are determined to not be damaged, then wraps closer to the first error wrap may be examined in a systematic manner to determine the outer boundary of the damaged region of the magnetic tape. Thus, the predetermined algorithm effectively includes examining wraps in one or more data bands according to a systematic process until the number of servo errors detected in a certain LPOS range of a given wrap decreases to less than or equal to the error threshold value. This allows for the outer boundary of the damaged region to be efficiently and accurately located.

Accordingly, if no errors, or a sufficiently low number of errors, are detected in step 4, the predetermined algorithm includes performing another diagnostics locate operation on a wrap of the magnetic tape which is located intermediate between the last examined wrap in the previous step (here step 4), and the first error wrap. See step 5.1. Following that path of the predetermined algorithm, the number of servo errors detected in step 5.1 may further determine subsequent action(s) taken. In some approaches the number or servo errors detected in step 5.1 may be sufficiently low or non-existent to indicate that the wrap in which the diagnostics locate operation was performed is not damaged. Thus, the predetermined algorithm would again perform another diagnostics locate operation on a wrap of the magnetic tape which is located intermediate between the wrap in which step 5.1 was performed, and the first error wrap.

Alternatively, if a number of errors are detected while performing step 4 which exceeds the error threshold value, the predetermined algorithm includes performing another diagnostics locate operation on a wrap of the magnetic tape which is located in a same data band as, but also farthest from, the first error wrap. See step 5.2. Again, the number of servo errors detected in step 5.2 may further determine subsequent action(s) taken. In some approaches the number or servo errors detected in step 5.2 may be sufficiently low or non-existent to indicate that the wrap in which the diagnostics locate operation was performed is not damaged. Thus, the predetermined algorithm would next perform a diagnostics locate operation on a wrap of the magnetic tape which is located intermediate between the wrap in which step 5.2 was performed, and the first error wrap.

However, should the number of servo errors detected in step 5.2 exceed the error threshold value, it may be determined that the entire data band on which the first error 1106 is located is damaged. Accordingly, in order to determine the extent of damage on the magnetic tape with further accuracy, wraps of the magnetic tape in the data bands adjacent the data band in which the first error 1106 is located may be examined. The process of examining adjacent data bands may begin at a first wrap thereof (e.g., the center wrap along the cross-track direction 1110) and proceed according to the various steps described herein in correspondence with FIG. 11A, e.g., as would be appreciated by one skilled in the art after reading the present description. It should be noted that although the same error threshold value is used to evaluate each of the data tracks (wraps) of the magnetic tape as described herein, in other approaches a unique error threshold value may be predetermined for each of the respective data tracks, the error threshold value may change (e.g., be updated) over time, etc.

With regard to steps 5.1 and 5.2, the actual processes included in performing these steps may also follow those illustrated in FIG. 11C. In other words, regardless of whether step 5.1 or step 5.2 is performed, each step may include the same or similar processes. Accordingly, the processes involved with performing step 5.1 and/or step 5.2 may be the same or similar to those involved with performing step 3 of the predetermined algorithm. However, it should be noted that steps 5.1 and 5.2 are illustrated as being performed in a forward direction (towards an end of tape), while step 3 is performed in a backward direction (towards a beginning of tape). Accordingly, the instructions sent to the tape drive to induce the relative motion between the magnetic tape and the magnetic head may differ in that regard according to some approaches.

It should be noted that although various steps of the predetermined algorithm are described in relation to FIG. 11A as depending on a number of servo errors detected in a given band that is examined, the progression of the steps may additionally or alternatively depend on other factors. According to some approaches, a total longitudinal length of the area determined to be damaged may have an effect on the progression of the predetermined algorithm. For instance, determining that each of the damaged areas in a given band have a total longitudinal length which does not exceed a predetermined longitudinal length may result in a same progression of the predetermined algorithm as if a number of errors detected in that band exceed the error threshold value. According to an exemplary approach, which is in no way intended to limit the invention, in response to determining that each of the damaged areas detected in step 4 have a total longitudinal length which does not exceed a predetermined longitudinal length may result in the predetermined algorithm proceeding to step 5.2, whereby another diagnostics locate operation is performed on a wrap of the magnetic tape which is located in a same data band as, but also farthest from, the first error wrap. According to another exemplary approach, which is in no way intended to limit the invention, in response to determining that each of the damaged areas detected in step 5.2 have a total longitudinal length which does not exceed a predetermined longitudinal length may result in the predetermined algorithm proceeding a data band adjacent the currently examined data band, whereby another diagnostics locate operation is performed on a wrap of the adjacent data band, e.g., as described above.

Furthermore, the particular direction in which a given diagnostics locate operation is illustrated and/or described herein as being performed may be desirable in view of the current orientation of the magnetic head relative to the magnetic tape. For instance, the magnetic head is positioned upstream (closer to the beginning of tape) from the first error 1106 as a result of performing step 3. Accordingly, it is preferred that step 4 is performed in a forward direction (towards the end of tape) such that only a lateral adjustment need be made to do so, rather than also having to perform a longitudinal adjustment in order to perform step 4 in the backward direction (towards the beginning of tape) as well. However, the direction in which the various steps are performed may vary depending on user input, tape conditions, predetermined scenarios being met, etc. Moreover, it should be noted that even when servo errors are not limited to a certain LPOS range, but rather are distributed over the entire LPOS range of a given wrap, the other wraps may be inspected across their entire respective LPOS range, e.g., in the same or similar manner as a previous step to determine the area where errors have occurred.

It follows that the predetermined algorithm may be used to determine one or more areas in one or more specific wraps (data tracks) of the magnetic tape, while incorporating the first error location. In other words, the predetermined algorithm provides numbered steps which provide an order in which the one or more areas are selected and/or inspected for damage on the magnetic tape in response to experiencing the first error. Moreover, the predetermined algorithm is preferably adaptive and able to provide an output which incorporates the status of previously examined areas of the magnetic tape in order to efficiently and accurately locate the outer boundary of the damaged region on the magnetic tape. As a result, the various processes described and/or suggested in relation to FIGS. 9-11C significantly improve system (e.g., overall tape library) performance.

In some approaches, after unloading an inspected magnetic tape from a tape drive, the magnetic tape may be reexamined by a different tape drive. As previously mentioned, the errors detected on a magnetic tape may actually be caused by faults of the tape drive itself rather than the magnetic tape. Thus, a server may instruct the same test be performed on the magnetic tape, but by a different tape drive. Instructions to load the magnetic tape in another tape drive may be sent to a robotic accessor which is used to move the magnetic tape between the two tape drives. Moreover, the second tape drive is preferably used to determine whether the first error originates from a particular tape drive, e.g., by repeating any one or more of the processes included in FIGS. 9-11C above. If there is no difference in the errors detected by the two different tape drives, the server determines that the magnetic tape itself is damaged. However, if there are differences between the errors detected by the two different tape drives, the server may determine that one or both of the tape drives have problems, and records that problem information internally. Thus, the next time an error occurs while using one of the tape drives to perform subsequent operations, the server may attempt performing the read and/or write operations using a different tape drive.

As described above, the information which indicates various areas of the magnetic tape as actually being damaged areas may be stored for future use. According to one approach, the information indicating the identified damaged areas of the magnetic tape to be recorded in memory located in the tape cartridge which the magnetic tape is stored. Thus, the information pertaining to which areas of the magnetic tape are damaged may be accessed by any tape cartridge in which the magnetic tape is loaded from the tape cartridge, and/or a robotic accessor which may be able to read the cartridge memory also.

According to some approaches, the information indicating the identified damaged areas of the magnetic tape may be used to predict damage on other magnetic tapes. For instance, the information indicating damaged areas on a first magnetic tape may be used to predict the presence of one or more other magnetic tapes having a substantially similar or same damage as that of the first magnetic tape. The prediction of one or more other magnetic tapes having a substantially similar or same damage as that of the first magnetic tape may be based on the identified damaged areas of the first magnetic tape. In other words, the prediction may be made on the basis of the damage identified in the first magnetic tape. However, in other approaches the prediction may be based on similarities in the storage conditions of the first magnetic tape and other magnetic tapes, a generation of the magnetic tapes, an amount of read and/or write operations performed on the magnetic tapes, etc. It follows that in some approaches, statistics on the obtained damaged area(s) may be gathered (e.g., by the server). Moreover, the statistics may be used to predict presence of magnetic tapes having the similar damaged area(s) prior to actually experiencing an error while reading and/or writing thereto. According to an example which is in no way intended to limit the invention, diagnostics information of the magnetic tapes used on a same tape drive may be gathered and compared for making use of the results to determine drive specific problems and/or to propose usage of the tape drive which results in fewer damages.

Figure 12:
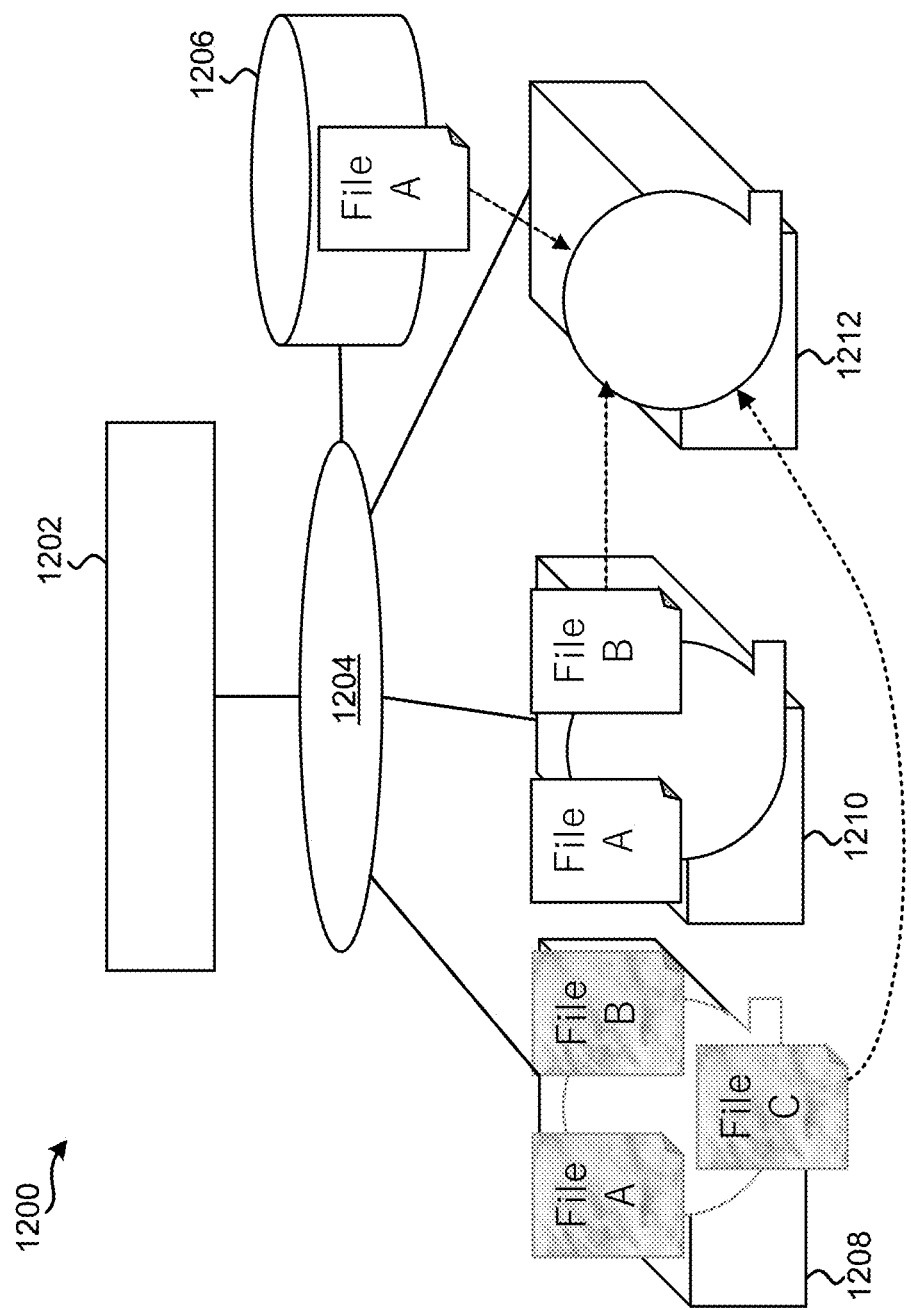
FIG. 12 is a partial representational view of a system-based process, according to one embodiment.

Referring now to FIG. 12, a system-based process 1200 of making a backup copy of data stored in the identified damaged area(s) of the magnetic tape according to a preferential basis is illustrated in accordance with one embodiment. The system-based process 1200 may be performed in accordance with the present invention in any of the environments depicted in FIGS. 1-11C, among others, in various embodiments. Of course, more or less operations than those specifically described in FIG. 12 may be included in the system-based process 1200, as would be understood by one of skill in the art upon reading the present descriptions.

Each of the steps of the system-based process 1200 may be performed by any suitable component of the operating environment. For example, one or more of the processes included in the system-based process 1200 may be performed by a controller in a server 1202 which is electrically coupled to one or more tape drives 1208, 1210, 1212. Moreover, in various embodiments, the system-based process 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the system-based process 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 1200, a server 1202 is coupled to a switch 1204, which in turn is coupled to a cache memory 1206, a first tape drive 1208, a second tape drive 1210, and a third tape drive 1212.

The server 1202 may determine the wrap and/or LPOS information corresponding to the area of the magnetic tape where file data is present. This determination may be made, at least in part, on the basis of data extent information stored in an LTFS Index (e.g., see 820 of FIG. 8). The server 1202 may tabulate the data extent information items from the LTFS Index, sort the items with the wrap and LPOS information, and thereby determine files having data in the damaged area of the magnetic tape.

For example, the server 1202 may determine that File A, File B, and File C contain data, and are stored at a physical location on the magnetic tape loaded in tape drive 1208 which is damaged. Accordingly, it is preferred that server 1202 make a backup copy of the data included in File A, File B, and File C on another magnetic tape. Moreover, the manner in which the backup copies of the data in File A, File B, and File C are formed preferably follows a preferential basis. According to the present description, a "preferential basis" may depend on if and where copies of File A and/or File B are stored at other locations in the system. In order to reduce latency, decrease run-time, etc., copies of the data included in damaged files are preferably made in a most efficient manner possible. For instance, an access time associated with the medium on which data corresponding to one or more of the files may have an effect on how the backup copies are formed. Accordingly, making the backup copy of the data included in File A, File B, and File C may vary depending on the situation when following the preferential basis.

Looking to the present embodiment illustrated in FIG. 12, a copy of File A is stored in cache 1206 (e.g., on a disk cache) as well as on the tape loaded in tape drive 1210. Because cache has a data access time which is quicker than magnetic tape, the data corresponding to File A is preferably copied from cache 1206 to a backup magnetic tape loaded in tape drive 1212 rather than from the tape in tape drive 1210. However, a copy of File B is only located on the tape in tape drive 1210. Thus, tape drive 1210 may be used to read File B from the tape loaded therein, whereby the data may be sent to tape drive 1212 and used to form another backup copy of File B on the backup tape loaded therein. It follows that even when backup copies of damaged files already exist in a system, it may be desirable to form another backup copy, e.g., in order to maintain a desired number of copies of the files.

However, should the data corresponding to one or more damaged files only be located in the damaged magnetic tape, the server may send instructions to a tape drive to read the readable portions of the damaged files, and makes backup copies of the readable data on another magnetic tape. Referring still to FIG. 12, because File C is only located on the damaged magnetic tape in tape drive 1208, the server 1202 may instruct the tape drive 1208 to read the readable portions of File C from the damaged magnetic tape, and send the readable data to tape drive 1212 whereby a copy of at least a portion of File C may be made on the magnetic tape loaded therein.

Although noted above, it should again be described that although various ones of the processes described herein have been in the context of being executed via commands issued by a server, any one or more of these processes may be performed by a tape drive itself. For example, a tape drive may be configured to execute any one or more of the processes included in FIGS. 9-12 and/or portions thereof, e.g., by automatically performing error detection. In other approaches, a server may determine the inspection ranges in which diagnostics locate operations are to be performed, and convey those ranges to the tape drive which actually performs the diagnostics locate operations. The tape drive may then perform returns results of the diagnostics locate operations to the server, which may then evaluate (e.g., judge) the identified damaged area(s) of the magnetic tape based on the inspection results.

It follows that various ones of the approaches described herein are able to provide significant improvements over conventional products. For instance, conventional diagnostics methods diagnose tape damages on the basis of error history recorded in memory (e.g., cartridge memory, a tape map, etc.). However, this process severely limits achievable results, as it is only possible to inspect damages in the areas of the tape where read/write operations have already been performed. In sharp contrast, the approaches described herein are able to accurately and efficiently detect damages on magnetic tape even in areas where read/write operations have not been performed at all.

Other conventional products have attempted to overcome these conventional shortcomings, but have been limited to only two possible workarounds. The first of these workarounds is to move the entirety of the content on the magnetic tape to another magnetic tape, and the second of these workarounds is to re-attempt reading the portion of data which returned the error in the hopes that the error was only temporary. However, both of these workarounds are undesirable as they undesirably increase latency while also consuming additional storage capacity and fail to solve the actual issue.

Again in sharp contrast, various approaches included herein duplicate the data written in the damaged areas of the magnetic tape before the tape medium becomes completely unreadable. As a result, the data stored in the most volatile (e.g., damaged) areas of the magnetic tape are promptly read from another storage location and/or the damaged magnetic tape itself in order to create a backup copy on another medium, thereby maintaining a duplicative backup. Furthermore, by registering the information about a damaged area of a magnetic tape (e.g., in memory or on another magnetic tape), even when a magnetic tape is partially damaged, use of the magnetic tape itself in which an error has actually occurred remains possible by requesting exclusive use of the undamaged areas. This not only prevents additional errors from occurring, but also avoids an unnecessary loss of storage space which would otherwise be experienced in conventional products.

Further still, various ones of the approaches herein are able to actively predict additional damage before it is actually realized. As described above, damage patterns and related information may be gathered and analyzed in order to determine magnetic tapes, tape drives, usage patterns, etc. which are prone to damages. Accordingly, appropriate usage and/or preventative measures may be proposed which ultimately results in a fewer number of overall damages, thereby increasing efficiency of the system as a whole, increasing longevity of data storage mediums, reducing latency, increasing data access times, etc.

Figure 13A:
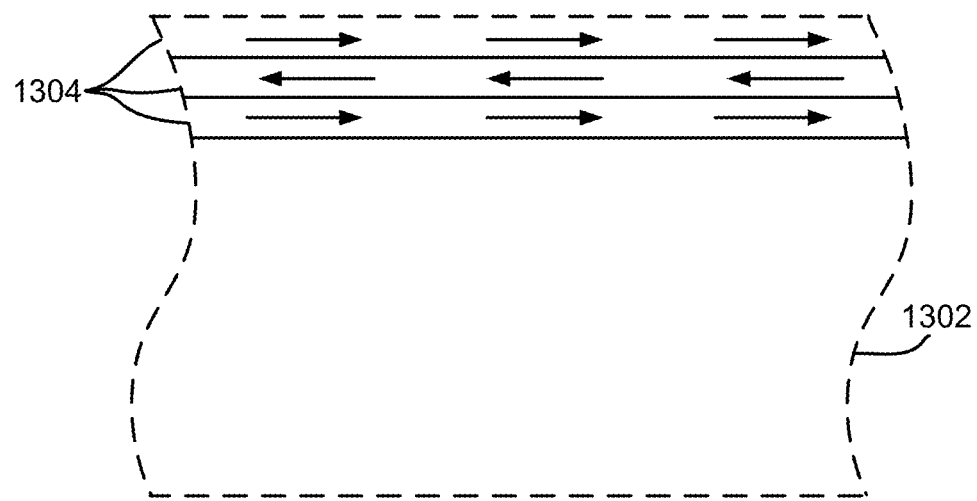
FIG. 13A is a diagram of a magnetic tape with tracks written in a non-serpentine fashion according to one embodiment.
Figure 13B:
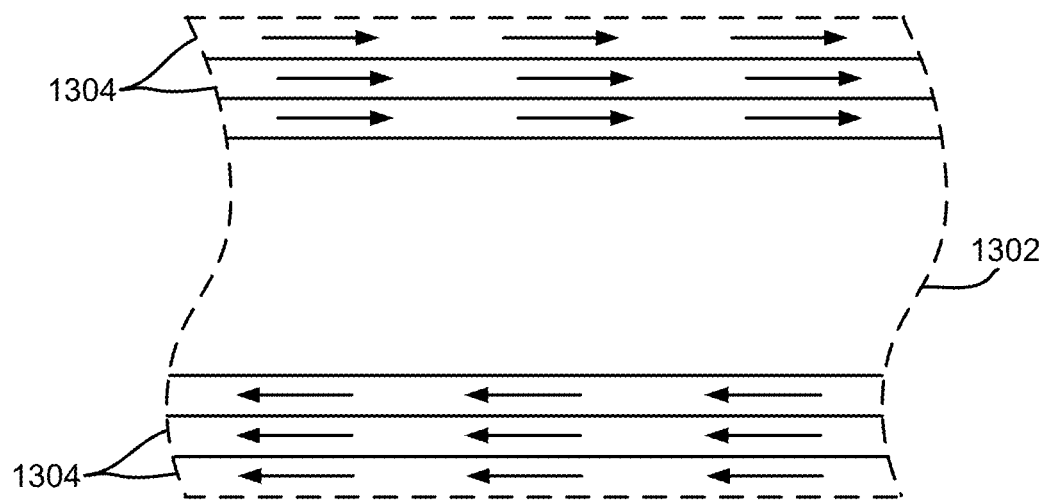
FIG. 13B is a diagram of a magnetic tape with tracks written in a serpentine fashion according to one embodiment.

Referring momentarily now to FIGS. 13A-13B, the differences between writing data tracks in a serpentine pattern are compared to writing data tracks in a non-serpentine fashion. Looking first to the representational diagram of FIG. 13A, which is in no way intended to limit the invention, the orientation of the arrows in each of the tracks 1304 are intended to represent the direction of tape travel when the corresponding track was written to the magnetic tape 1302, preferably by a single array of writers configured for writing in both writing directions. Thus, a first offset lateral writing position may be applied to the writer array while writing data to tracks in a first direction and a second offset lateral writing position may be applied to the writer array while writing data to tracks in a second direction opposite the first direction.

Looking now to the representational diagram of FIG. 13B, which is in no way intended to limit the invention, the orientation of the arrows in each of the tracks 1304 are intended to represent the direction of tape travel when the corresponding data was written to the tape 1302. In contrast to the diagram of FIG. 13A, here data tracks corresponding to a first "forward" direction of tape travel are written to the top portion of a data partition, while data tracks corresponding to a second "backward" direction of tape travel are written to the bottom portion of the data partition. This preferably reduces writing errors, readback errors, data loss, etc. and ensures consistency while writing, e.g., by enabling symmetrical servo pattern reading.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
    receiving, from a tape drive, a first error location on a magnetic tape where a first error occurred;
    determining one or more areas on the magnetic tape to be examined based on the first error location;
    independent of a read and/or write operation, instructing the tape drive to induce relative motion between a tape head and the magnetic tape such that the tape head is positioned adjacent to each of the respective one or more areas in turn;
    identifying each of the one or more areas having a respective number of measured servo errors which exceeds a threshold value as a damaged area of the magnetic tape; and
    determining one or more areas on a second wrap of the magnetic tape to be examined, wherein the second wrap is adjacent to a first wrap of the magnetic tape which includes the first error location, wherein the one or more areas are determined using a predetermined algorithm.

2. The computer-implemented method as recited in claim 1, comprising:
    determining whether the first error was caused by the tape drive itself; and
    in response to determining that the first error was not caused by the tape drive itself, determining the one or more areas on the magnetic tape to be examined based on the first error location,
    wherein the first error is a permanent error.

3. The computer-implemented method as recited in claim 1, comprising:
    making a backup copy of data stored in the identified damaged area(s) of the magnetic tape by copying the data from a buffer memory or another storage medium having a copy of the data stored in the identified damaged area(s) of the magnetic tape, wherein the backup copy is stored on a second magnetic tape; and
    predicting a presence of one or more other magnetic tapes having a substantially similar damage as that of the magnetic tape based on storage conditions of each of the respective magnetic tapes and/or a number of data operations that have been performed on each of the respective magnetic tapes.

4. The computer-implemented method as recited in claim 1, comprising:
    predicting a presence of one or more other magnetic tapes having a substantially similar damage as that of the magnetic tape based on the identified damaged area(s) of the magnetic tape.

5. The computer-implemented method as recited in claim 1, comprising:
    instructing the magnetic tape be loaded into a second tape drive which is different than the tape drive; and performing the following process:
  determining one or more areas on the magnetic tape to be examined, wherein the one or more areas are determined using a predetermined algorithm which incorporates the first error location,
  independent of a read and/or write operation, instructing the second tape drive to induce relative motion between the tape head and the magnetic tape such that the tape head is positioned adjacent to each of the respective one or more areas in turn,
  instructing the second tape drive to measure a number of servo errors that occur in each of the respective one or more areas, and
  identifying each of the one or more areas having a respective number of measured servo errors which exceeds a threshold value as a damaged area of the magnetic tape.

6. The computer-implemented method as recited in claim 1, comprising:
  determining whether a tape map includes records of read and/or write and/or locate operations performed in a current load of the magnetic tape,
  wherein identifying each of the one or more areas as a damaged area of the magnetic tape is performed using the records in response to determining that the tape map includes the records.

7. The computer-implemented method as recited in claim 1, comprising:
  independent of a read and/or write operation, instructing the tape drive to induce relative motion between the tape head and the magnetic tape such that the tape head is positioned adjacent to each of the respective one or more areas on the second wrap in turn;
  instructing the tape drive to use the tape head to measure a number of servo errors that occur in each of the respective one or more areas on the second wrap; and
  identifying each of the one or more areas on the second wrap having a respective number of measured servo errors which exceeds the threshold value as a damaged area of the magnetic tape.

8. A computer program product, comprising a computer readable storage medium having program instructions embodied therewith, the program instructions readable and/or executable by a processor to cause the processor to:
  receive, by the processor, a first error location on a magnetic tape where a first error occurred;
  determine, by the processor, one or more areas on the magnetic tape to be examined based on the first error location;
  independent of a read and/or write operation, instruct, by the processor, a tape drive to induce relative motion between a tape head and the magnetic tape such that the tape head is positioned adjacent to each of the respective one or more areas in turn;
  identify, by the processor, each of the one or more areas having a respective number of measured servo errors which exceeds a threshold value as a damaged area of the magnetic tape; and
  determine, by the processor, one or more areas on a second wrap of the magnetic tape to be examined, wherein the second wrap is adjacent to a first wrap of the magnetic tape which includes the first error location, wherein the one or more areas are determined using a predetermined algorithm.

9. The computer program product as recited in claim 8, the program instructions readable and/or executable by the processor to cause the processor to:
  determine, by the processor, whether the first error was caused by the tape drive itself; and
  in response to determining that the first error was not caused by the tape drive itself, determine, by the processor, the one or more areas on the magnetic tape to be examined based on the first error location,
  wherein the first error is a permanent error.

10. The computer program product as recited in claim 8, the program instructions readable and/or executable by the processor to cause the processor to:
  make, by the processor, a backup copy of data stored in the identified damaged area(s) of the magnetic tape by copying the data from a buffer memory or another storage medium having a copy of the data stored in the identified damaged area(s) of the magnetic tape, wherein the backup copy is stored on a second magnetic tape; and
  predict, by the processor, a presence of one or more other magnetic tapes having a substantially similar damage as that of the magnetic tape based on a number of data operations that have been performed on each of the respective magnetic tapes.

11. The computer program product as recited in claim 8, the program instructions readable and/or executable by the processor to cause the processor to:
  predict, by the processor, a presence of one or more other magnetic tapes having a substantially similar damage as that of the magnetic tape based on the identified damaged area(s) of the magnetic tape.

12. The computer program product as recited in claim 8, the program instructions readable and/or executable by the processor to cause the processor to:
  instruct, by the processor, the magnetic tape be loaded into a second tape drive which is different than the tape drive; and
  perform, by the processor, the following process:
    determining one or more areas on the magnetic tape to be examined, wherein the one or more areas are determined using a predetermined algorithm which incorporates the first error location,
    independent of a read and/or write operation, instructing the second tape drive to induce relative motion between the tape head and the magnetic tape such that the tape head is positioned adjacent to each of the respective one or more areas in turn,
    instructing the second tape drive to measure a number of servo errors that occur in each of the respective one or more areas, and
    identifying each of the one or more areas having a respective number of measured servo errors which exceeds a threshold value as a damaged area of the magnetic tape.

13. The computer program product as recited in claim 8, the program instructions readable and/or executable by the processor to cause the processor to:
  determine, by the processor, whether a tape map includes records of read and/or write and/or locate operations performed in a current load of the magnetic tape,
  wherein identifying each of the one or more areas as a damaged area of the magnetic tape is performed using the records in response to determining that the tape map includes the records.

14. The computer program product as recited in claim 8, the program instructions readable and/or executable by the processor to cause the processor to:
  independent of a read and/or write operation, instruct, by the processor, the tape drive to induce relative motion between the tape head and the magnetic tape such that the tape head is positioned adjacent to each of the respective one or more areas on the second wrap in turn;

instruct, by the processor, the tape drive to use the tape head to measure a number of servo errors that occur in each of the respective one or more areas on the second wrap; and identify, by the processor, each of the one or more areas on the second wrap having a respective number of measured servo errors which exceeds the threshold value as a damaged area of the magnetic tape.

15. A tape drive, comprising:

a controller; and logic integrated with and/or executable by the controller, the logic being configured to cause the controller to:

receive, by the controller, a first error location on a magnetic tape where a first error occurred;

determine, by the controller, one or more areas on the magnetic tape to be examined based on the first error location;

independent of a read and/or write operation, instruct, by the controller, a tape drive to induce relative motion between a tape head and the magnetic tape such that the tape head is positioned adjacent to each of the respective one or more areas in turn;

identify, by the controller, each of the one or more areas having a respective number of measured servo errors which exceeds a threshold value as a damaged area of the magnetic tape; and determine, by the controller, one or more areas on a second wrap of the magnetic tape to be examined, wherein the second wrap is adjacent to a first wrap of the magnetic tape which includes the first error location.

16. The tape drive as recited in claim 15, wherein the first error is a permanent error which occurred while performing read and/or write operations on the magnetic tape.

17. The tape drive as recited in claim 15, the logic being configured to cause the controller to:

make, by the controller, a backup copy of data stored in the identified damaged area(s) of the magnetic tape by copying the data from a buffer memory or another storage medium having a copy of the data stored in the identified damaged area(s) of the magnetic tape, wherein the backup copy is stored on a second magnetic tape.

18. The tape drive as recited in claim 15, the logic being configured to cause the controller to:

predict, by the controller, a presence of one or more other magnetic tapes having a substantially similar damage as that of the magnetic tape based on the identified damaged area(s) of the magnetic tape.

19. The tape drive as recited in claim 15, the logic being configured to cause the controller to:

predict, by the controller, a presence of one or more other magnetic tapes having a substantially similar damage as that of the magnetic tape based on storage conditions of each of the respective magnetic tapes and/or a number of data operations that have been performed on each of the respective magnetic tapes.

20. The tape drive as recited in claim 15, the logic being configured to cause the controller to:

determine, by the controller, whether a tape map includes records of read and/or write and/or locate operations performed in a current load of the magnetic tape, wherein identifying each of the one or more areas as a damaged area of the magnetic tape is performed using the records in response to determining that the tape map includes the records.

* * * * *